(12) United States Patent
Suzuki et al.

(10) Patent No.: US 10,257,504 B2
(45) Date of Patent: Apr. 9, 2019

(54) DISPLAY DEVICE

(71) Applicant: Japan Display Inc., Minato-ku (JP)

(72) Inventors: Daichi Suzuki, Tokyo (JP); Takeo Koito, Tokyo (JP)

(73) Assignee: Japan Display Inc., Minato-ku (JP)

( * ) Notice: Subject to any disclaimer, the term of this patent is extended or adjusted under 35 U.S.C. 154(b) by 53 days.

(21) Appl. No.: 15/424,203

(22) Filed: Feb. 3, 2017

(65) Prior Publication Data

US 2017/0230642 A1 Aug. 10, 2017

(30) Foreign Application Priority Data

Feb. 4, 2016 (JP) .................................. 2016-019732

(51) Int. Cl.
| | |
|---|---|
| *H04N 13/31* | (2018.01) |
| *H04N 13/324* | (2018.01) |
| *G09G 3/36* | (2006.01) |
| *G09G 3/00* | (2006.01) |
| *H04N 13/373* | (2018.01) |

(52) U.S. Cl.
CPC ............. *H04N 13/31* (2018.05); *G09G 3/003* (2013.01); *G09G 3/36* (2013.01); *H04N 13/324* (2018.05); *H04N 13/373* (2018.05); *G09G 2300/023* (2013.01); *G09G 2300/0857* (2013.01); *G09G 2310/0286* (2013.01); *G09G 2320/0261* (2013.01); *G09G 2320/0626* (2013.01); *H04N 2213/001* (2013.01)

(58) Field of Classification Search
None
See application file for complete search history.

(56) References Cited

U.S. PATENT DOCUMENTS

| 8,817,369 | B2* | 8/2014 | Daiku | G02B 27/0093 |
|---|---|---|---|---|
| | | | | 359/464 |
| 2004/0252374 | A1* | 12/2004 | Saishu | G02B 27/2214 |
| | | | | 359/462 |
| 2005/0280894 | A1* | 12/2005 | Hartkop | H04N 13/31 |
| | | | | 359/464 |
| 2011/0051239 | A1 | 3/2011 | Daiku | |
| 2012/0050857 | A1* | 3/2012 | Lee | H04N 13/31 |
| | | | | 359/464 |
| 2012/0105954 | A1* | 5/2012 | Prouty, IV | G02B 27/2214 |
| | | | | 359/462 |

(Continued)

FOREIGN PATENT DOCUMENTS

JP 2011-53277 3/2011

*Primary Examiner* — Reza Aghevli
(74) *Attorney, Agent, or Firm* — Oblon, McClelland, Maier & Neustadt, L.L.P.

(57) ABSTRACT

According to one embodiment, a display device includes a display unit which displays an image, a barrier unit including a plurality of barrier regions, each of the barrier regions including two nontransmissive regions which block light transmitted from the display unit and one transmissive region which is arranged between the two nontransmissive regions and allows light transmitted from the display unit to pass through, and a control unit. The control unit controls the barrier pitch of the barrier regions, according to viewer's position. Further, the control unit controls each of edge-units constituting the transmissive region into a state of transmissive or nontransmissive.

6 Claims, 16 Drawing Sheets

(56) References Cited

U.S. PATENT DOCUMENTS

| | | | | |
|---|---|---|---|---|
| 2013/0187910 A1* | 7/2013 | Raymond | ................ | G09G 5/14 |
| | | | | 345/419 |
| 2013/0258066 A1* | 10/2013 | Asano | .................... | G03B 35/08 |
| | | | | 348/47 |
| 2014/0035907 A1* | 2/2014 | Hasegawa | ............... | G09G 5/14 |
| | | | | 345/419 |
| 2014/0036046 A1* | 2/2014 | Hasegawa | ............ | H04N 13/128 |
| | | | | 348/54 |
| 2014/0285643 A1* | 9/2014 | Usukura | ............ | G02B 27/2214 |
| | | | | 348/59 |
| 2015/0036211 A1* | 2/2015 | Chen | .................. | G02B 27/2214 |
| | | | | 359/462 |
| 2015/0312546 A1* | 10/2015 | Hasegawa | ............ | H04N 13/398 |
| | | | | 348/59 |
| 2016/0360187 A1* | 12/2016 | Smithwick | ........... | H04N 13/398 |
| 2017/0163975 A1* | 6/2017 | Jin | .................... | G02B 27/2214 |

* cited by examiner

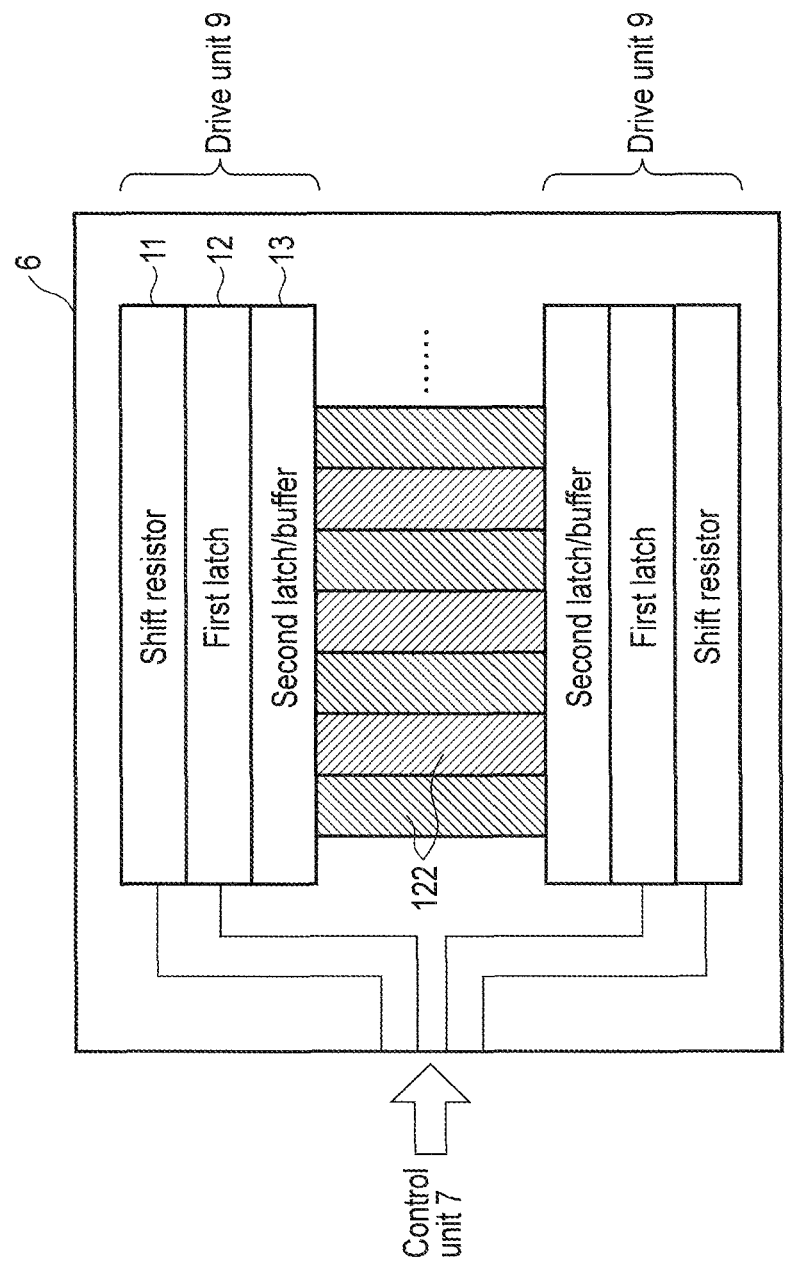
F I G. 18

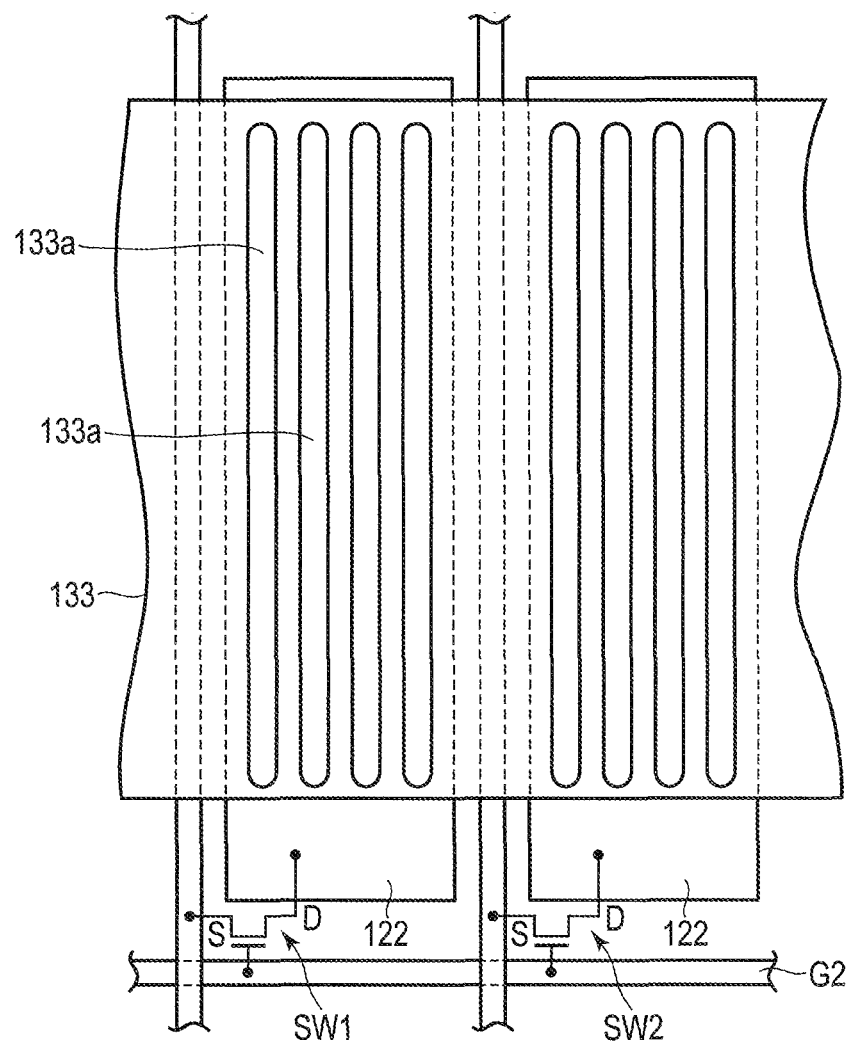
F I G. 20

DISPLAY DEVICE

CROSS-REFERENCE TO RELATED APPLICATIONS

This application is based upon and claims the benefit of priority from Japanese Patent Application No. 2016-019732, filed Feb. 4, 2016, the entire contents of which are incorporated herein by reference.

FIELD

Embodiments described herein relate generally to a display device which displays a stereoscopic image.

BACKGROUND

Some display devices including liquid crystal display (LCD) devices can display images in such a manner as to allow the viewers to see the images as stereoscopic images with their naked eyes. As an example of these display devices, there is a parallax barrier autostereoscopic display device comprising a display unit which displays a right eye image and a left eye image in a segmented and alternately-arranged manner, and a barrier unit which forms a parallax barrier in front of the display unit. The display device controls the slit width of the barrier unit according to the distance between the viewer and the display unit, and increases the stereoscopic image viewable distance in the forward-and-backward direction with respect to the display image.

In the parallax barrier autostereoscopic display device, it is possible to increase the stereoscopic image viewable distance in the forward-and-backward direction by controlling the parallax barrier, but at this time, the aperture ratio of the barrier unit changes, and thus it has been difficult to control the display image, in particular, the brightness of the display image.

BRIEF DESCRIPTION OF THE DRAWINGS

FIG. 18 is an explanatory diagrams showing the circuit structure of the barrier unit.

FIG. 20 is an explanatory diagram showing a relation between pixel electrodes and a common electrode in a part of the barrier unit.

DETAILED DESCRIPTION

Figure 1:
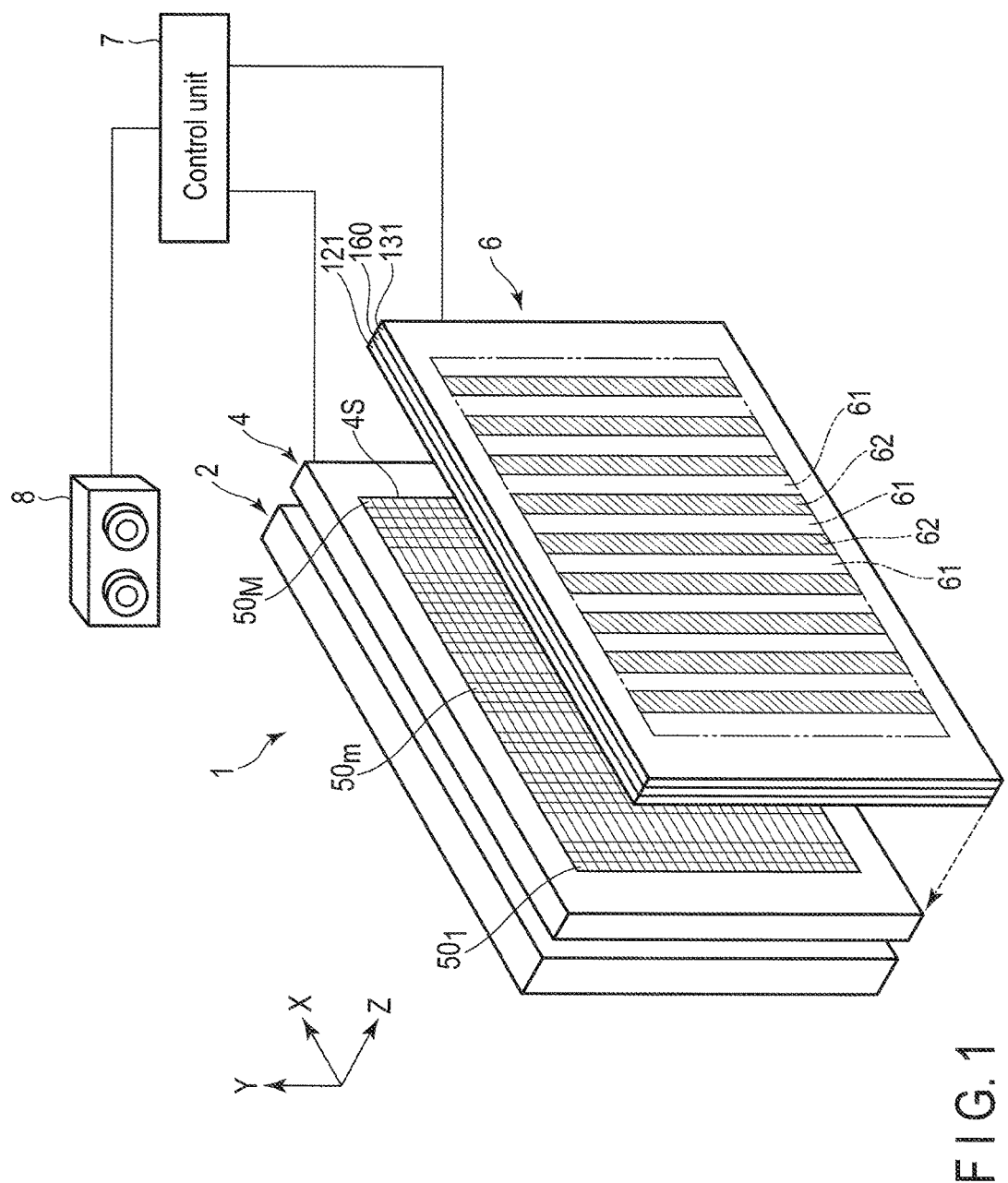
FIG. 1 is an exploded perspective view schematically showing the display device of an embodiment.

In general, according to one embodiments, a display device can increase a stereoscopic image viewable distance in a forward-and-backward direction by controlling a parallax barrier and can easily control a display image at the same time.

According to one embodiment, a display device comprises: a display unit including a display surface which displays an image; a barrier unit including a plurality of barrier regions, each of the barrier regions including two nontransmissive regions which block light transmitted from the display unit and one transmissive region which is arranged between the two nontransmissive regions and allows light transmitted from the display unit to pass through; and a control unit which produces the barrier regions in the barrier unit and controls arrangement of the barrier regions, wherein the control unit controls the barrier region having a first barrier pitch and the barrier region having a second barrier pitch in the barrier unit, the second barrier pitch including the transmissive region having a width which is the same as a width of the transmissive region of the barrier region having the first barrier pitch, and the nontransmissive region having a width which is different from a width of the nontransmissive region of the barrier region having the first barrier pitch, and the control unit controls a boundary region at the boundary between the transmissive region and the nontramsissive region in the barrier region having the second barrier pitch to be alternately displayed in a transmissive display (it may be called white display) mode and in a light blocking display (it may be called black display or nontransmissive display) mode every predetermined number of frames.

Embodiments will be further described with reference to the accompanying drawings. Note that, although certain embodiments will be described below, these embodiments are not intended to limit the present invention. Further, structural elements in the embodiments include those which are easily conceivable by a person having ordinary skill in the art or those which are substantially the same as the structural elements in the embodiments. Still further, the structural elements in the embodiments can be appropriately combined with each other. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, etc., of the respective parts are illustrated schematically in the drawings, rather than as an accurate representation of what is implemented. However, such schematic illustration is merely exemplary, and in no way restricts the interpretation of the invention. In addition, in the specification and drawings, the same elements as those described in connection with preceding drawings are denoted by like reference numbers, and detailed description thereof is omitted unless necessary.

Figure 2:
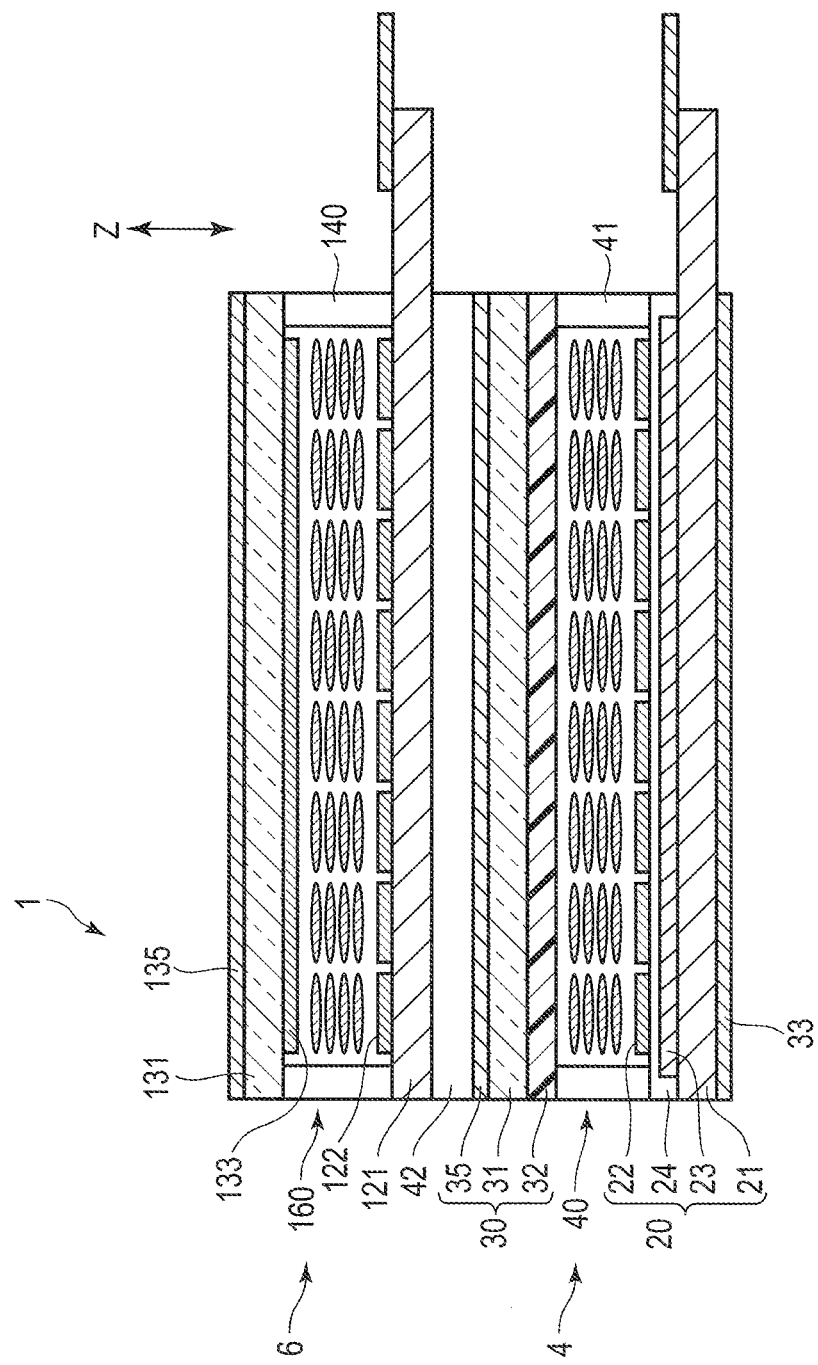
FIG. 2 is a sectional diagram schematically showing the sectional structure of the display device of the embodiment.

FIG. 1 is an exploded perspective view of the display device of the embodiment. FIG. 2 is a sectional diagram showing the sectional structure of the display device of the embodiment. A display device 1 of the present embodiment comprises a display unit 4 which includes a display surface 4S which displays an image, a lighting unit 2 which is provided below or behind the display unit 4, and a barrier unit 6 which is provided on the display surface 4S side of the display unit 4. The barrier unit 6 is a parallax control unit which controls parallax. In the following, an orthogonal xyz-coordinate system will be defined, and the positional relationships of the respective parts will be described with reference to the orthogonal xyz-coordinate system. One direction on a horizontal plane, namely, the direction of the x-axis is assumed to be a horizontal direction, while the direction which is orthogonal to the direction of the x-axis, namely, the direction of the y-axis is assumed to be a vertical direction. Further, the direction which is orthogonal to the direction of the x-axis and to the direction of the y-axis is assumed to be a forward-and-backward direction.

The display unit 4 is a liquid crystal panel comprising a plurality of pixels 50 which are bidirectionally arranged in an X direction and in a Y direction as shown in FIG. 1. For example, M number of pixels 50 is arranged in the X direction shown in FIG. 1. The m-th (m=1, 2, . . . , M) pixel 50 is presented as the pixel $50_m$. Similarly, a plurality of pixels 50 are also arranged in the Y direction. The lighting unit 2 emits light, and the light enters the display unit 4. The display unit 4 switches between a light transmissive mode and a light blocking mode and transmits the light at each of the pixels 50 selectively. In this way, the display unit 4 displays an image on the display surface 4S.

The lighting unit 2 is a lighting device which planarly emits light to the display unit 4. The lighting unit 2 comprises a light source and a light guide plate which evenly irradiates the display unit 4 with the light emitted from the light source.

The barrier unit 6 comprises a plurality of transmissive regions 61 which allow the light transmitted from the display unit 4 to pass through, and a plurality of nontransmissive regions 62 which block the light transmitted from the display unit 4. The transmissive regions 61 and the nontransmissive regions 62 are alternately arranged in the X direction shown in FIG. 1 and extend in the Y direction shown in FIG. 1. The barrier unit 6 is a liquid crystal panel comprising a liquid crystal layer 160 which is provided between a first substrate 121 and a second substrate 131, and voltages are partly applied to the barrier unit 6, then the barrier unit 6 performs liquid crystal alignment. In this operation, the barrier unit 6 can switch between the transmissive region 61 and the nontransmissive region 62. Note that the barrier unit 6 may be a liquid crystal lens comprising a variable lens array, and the barrier unit 6 may change the refractive index of the light and switch between the transmissive region and the nontransmissive region. A control unit 7 controls the lighting unit 2, the display unit 4 and the barrier unit 6 of the display device 1. Further, an imaging unit 8 acquires position information of the viewer. In the present embodiment, a head-tracking technique, an eye-tracking technique, and the like are used, and based on the image information of the viewer acquired by the imaging unit 8 such as a digital camera, a position information acquisition means of the control unit 7 calculates the position information of the viewer.

As shown in FIG. 2, the display unit 4 comprises an array substrate 20, a counter substrate 30 which is arranged in parallel to the surface of the array substrate 20, and faced to the surface of the array substrate 20, and a liquid crystal layer 40 which is interposed between the array substrate 20 and the counter substrate 30.

The array substrate 20 comprises a plurality of common electrodes 23 formed on the surface of a glass substrate 21, and a plurality of pixel electrodes 22 formed on the common electrodes 23 via an insulating layer 24. The plurality of pixel electrodes 22 are provided on the array substrate 20 and are arranged in a matrix. Note that the pixel electrodes 22 and the common electrodes 23 may be provided on the same plane or the common electrodes 23 may be provided above the pixel electrodes 22.

On the array substrate 20, pixel signal lines which supply pixel signals to the respective pixel electrodes 22 are elongated in the Y direction, and scanning signal lines are elongated in the X direction. In proximity to each of the intersections of the pixel signal lines and the scanning signal lines, a switching element which selectively connects the pixel signal line and the pixel electrode 22, namely, a thin-film transistor (TFT) element is formed.

Each of the array substrate 20 and the counter substrate 30 comprises an alignment film (not shown), and the liquid crystal layer 40 is interposed between the array substrate 20 and the counter substrate 30 and modulates the light transmitted through the liquid crystal layer 40 according to the state of the electric field. Note that the display unit 4 of the present embodiment is a liquid crystal display panel of a lateral electric field mode such as an in-plane switching (IPS) mode. Further, the display unit 4 is not limited to a liquid crystal display panel of a lateral electric field mode but may be a liquid crystal display panel of a longitudinal electric field mode such as a twisted nematic (TN) mode. Still further, the display unit 4 is not limited to the above-described liquid crystal display device but may be any display device as long as the display device performs image display by a matrix of pixels. For example, a display device such as an organic electroluminescent display (OLED) device or the like is also applicable to the display unit 4.

As shown in FIG. 2, the counter substrate 30 comprises a glass substrate 31 and a color filter 32 which is formed on one surface of the glass substrate 31. The array substrate 20 and the counter substrate 30 are attached to each other by a sealing member 41. A polarizer 33 is provided on the other surface of the array substrate 20. Further, a polarizer 35 is provided on the other surface of the counter substrate 30. Still further, the barrier unit 6 is attached to the opposite surface of the polarizer 35 to the counter substrate 30 side surface of the polarizer 35.

Figure 3:
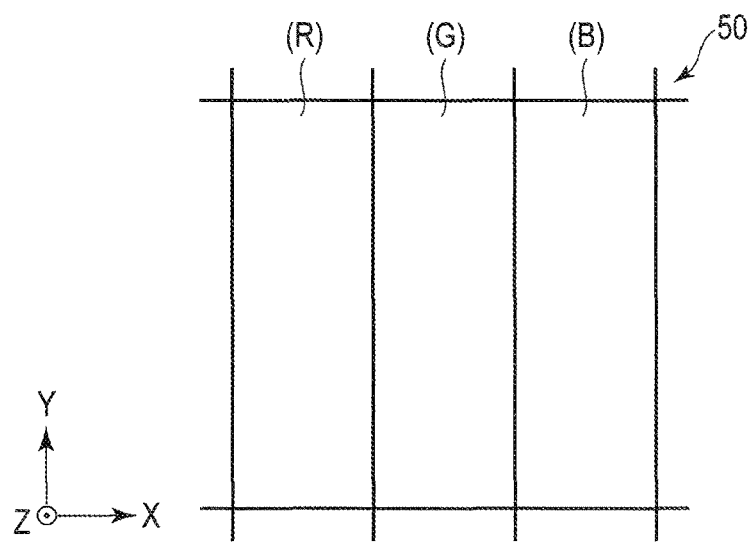
FIG. 3 is a diagram showing a pixel.

The color filter 32 includes, for example, color filters of three colors, that is, red (R), green (G), and blue (B), these color filters are arranged in cycles, and one set of the colors R, G, and B is associated with each of the above-described pixels 50 shown in FIG. 3. FIG. 3 is a schematic view of the pixel. Each of the pixels 50 is as a unit of color image display and includes, for example, a plurality of subpixels. In this example, the pixel 50 includes a subpixel (R) which displays the color R, a subpixel (B) which displays the color B, and a subpixel (G) which displays the color G. In the pixel 50, these subpixels (R), (B), and (G) are arranged in the X direction, that is, in the row direction of the display device 1.

Next, an example of the structure of the barrier unit 6 will be described. As shown in FIG. 2, the barrier unit 6 comprises the first substrate 121 and the second substrate 131, and the first substrate 121 and the second substrate 131 are attached to each other by the sealing member 140. Above the first substrate 121, a plurality of first electrodes 122 have a columnar shape or are elongated in a columnar fashion. Further, a second electrode 133 is provided on the first electrode 122 side of the second substrate 131, and a polarizer 135 is provided on the other side of the second substrate 131. These first electrodes 122 and the second electrode 133 are transparent electrodes of ITO or the like.

The first electrodes 122 are provided in such a manner as to correspond to the transmissive regions 61 and the nontransmissive regions 62 shown in FIG. 1. In a manner similar to the transmissive regions 61 and the nontransmissive regions 62 shown in FIG. 1, the first electrodes 122 are long thin plates which extend in the Y direction and are arranged in the X direction. That is, in the same direction as the arrangement direction of the subpixels (R), (B), and (G) of the pixels 50, namely, in the X direction, the first electrodes 122 are arranged at intervals and at least partly overlap the respective pixels 50. Further, the first electrodes 122 extend along the pixels 50 which are arranged in the Y direction, and at least partly overlap the respective pixels 50 which are arranged in the Y direction. In the present embodiment, the number of the first electrodes 122 is, for example, 23040. The second electrode 133 is a common electrode which is opposed to and is continuously formed across the plurality of first electrodes 122. Note that the second electrode 133 may also be a plurality of electrodes which are separately formed and are respectively opposed to the first electrodes 122.

The liquid crystal layer 160 is interposed between the second electrode 133 side surface of the second substrate 131 and the first electrode 122 side surface of the first substrate 121. The liquid crystal layer 160 modulates the light transmitted through the liquid crystal layer 160 according to the state of the electric field. In the present embodiment, for example, liquid crystal display panels of various modes such as the TN mode, a vertical alignment (VA) mode, and an electrically controlled birefringence (ECB) mode can be used. As another example, a liquid crystal display panel of a lateral electric field mode such as the IPS mode may also be used. Alignment films (not shown) are interposed between the liquid crystal layer 160 and the first substrate 121, and between the liquid crystal layer 160 and the second substrate 131, respectively. These alignment films are, for example, polyimide and are subjected to alignment treatment such as rubbing treatment. These alignments films control the alignment of liquid crystal molecules of the liquid crystal layer 160. In the present embodiment, since a liquid crystal display device is used in the display unit 4, the light transmitted from the display unit 4 is polarized. Therefore, the light can be directly transmitted to the liquid crystal layer 160, and there is no need to provide any additional polarizer between the first substrate 121 and the display unit 4. Note that, if the light transmitted from the display unit 4 is not polarized, an additional polarizer may be provided below the first substrate 121, that is, on the display unit 4 side of the first substrate 121.

Figure 4:
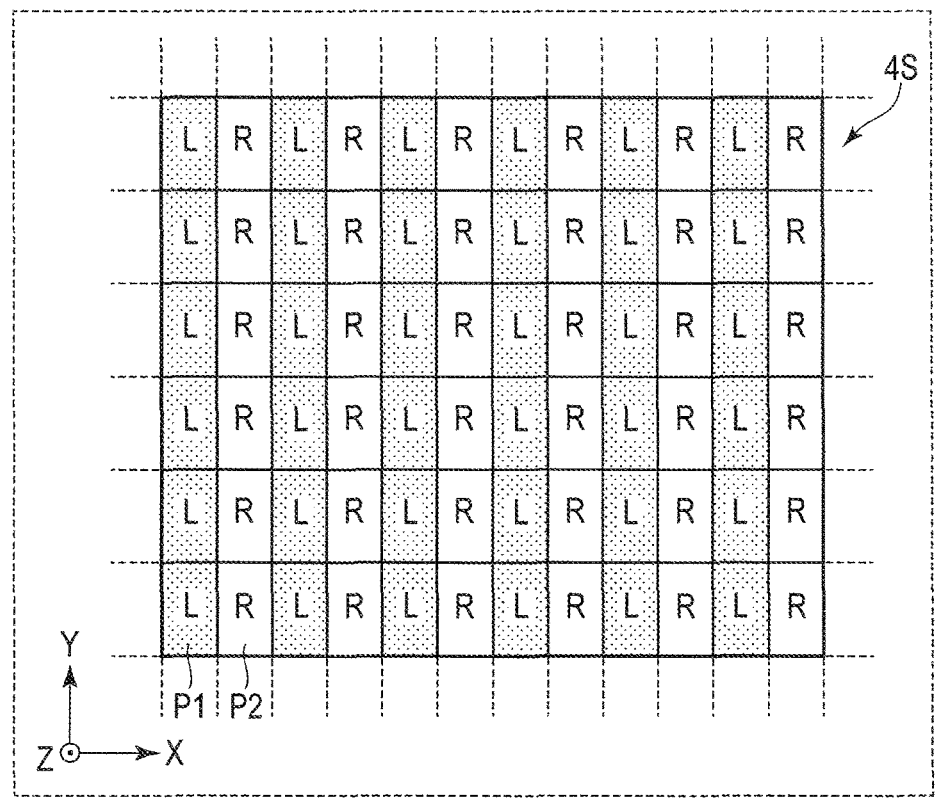
FIG. 4 is a diagram showing an example of the display of a right eye image and a left eye image on the display unit.
Figure 5:
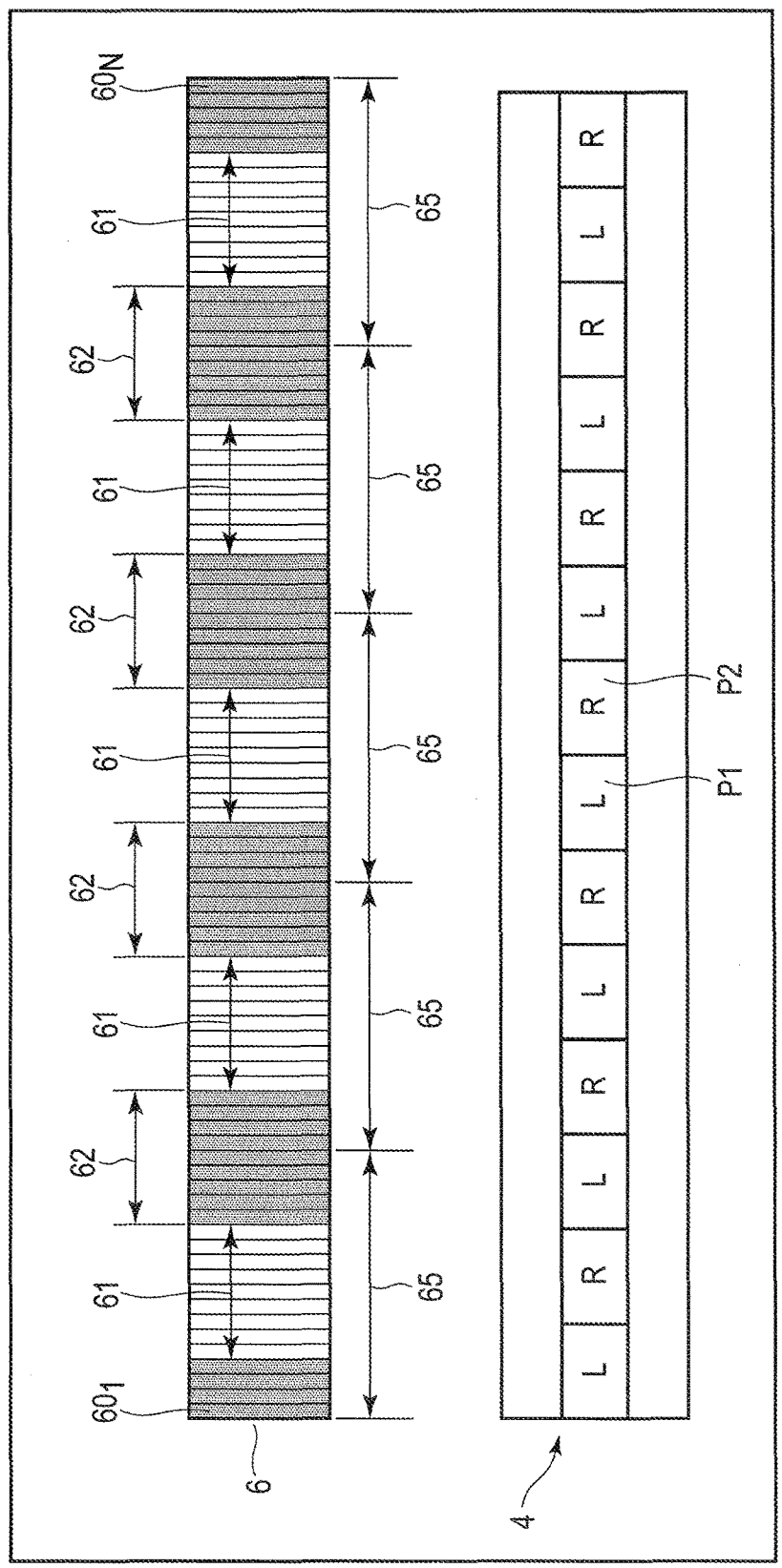
FIG. 5 is a sectional diagram showing the sectional structures of a barrier unit and the display unit.
Figure 6:
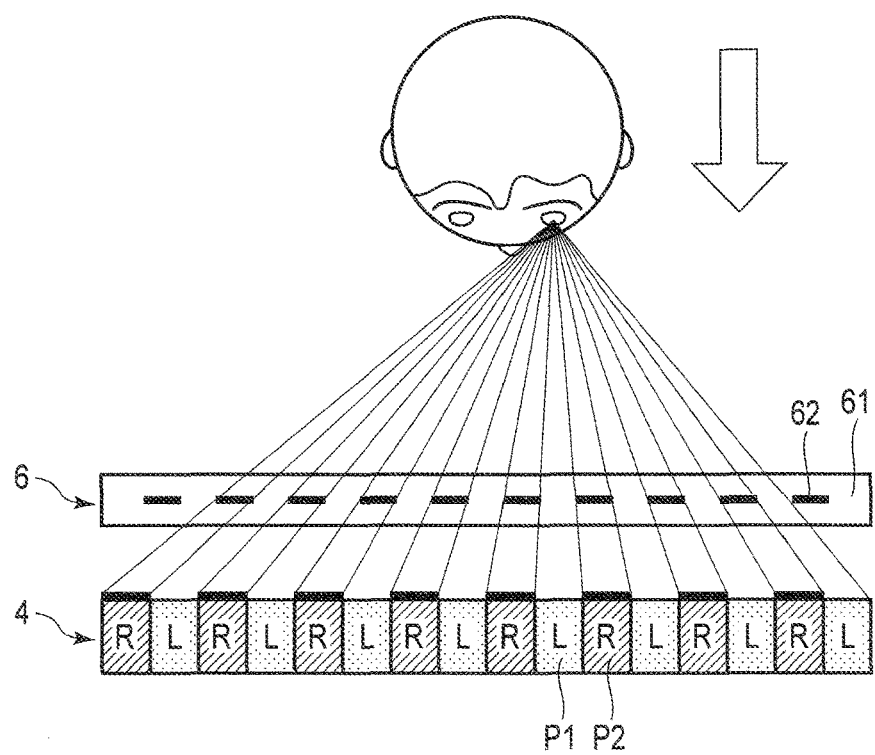
FIG. 6 is an explanatory diagram showing the relationship between the lines of sight of the viewer and the barrier unit.

FIG. 4 is a diagram showing an example of the display of a right eye image and a left eye image on the display unit. FIG. 5 is a sectional diagram schematically showing the sectional structures of the barrier unit and the display unit. FIG. 6 is an explanatory diagram showing the relationship between the lines of sight of the viewer and the barrier unit. As shown in FIG. 4, the display unit 4 displays images corresponding to the respective lines of sight (for example, a left eye image P1 and a right eye image P2) on one screen in such a manner as to allow the viewer to see these images as a three-dimensional image. In the display, the left eye image P1 and the right eye image P2 are alternately arranged in the X direction. Note that, in the present embodiment, each pixel of the left eye image P1 and the right eye image P2 shown in FIG. 4 corresponds to the pixel 50 comprising the three subpixels (R), (B) and (G) shown in FIG. 3. Alternatively, each pixel of the left eye image P1 and the right eye image P2 may correspond to one subpixel (R) of the three subpixels (R), (B), and (G).

As shown in FIG. 5, the barrier unit 6 comprises a plurality of unit regions 60 which correspond to the first electrodes 122 (not shown in FIG. 5), respectively. The barrier unit 6 controls the electric field to be applied to the liquid crystal layer 160 shown in FIG. 2 and switches between the transmissive region 61 and the nontransmissive region 62 on a unit region 60 basis. The unit regions 60 include, for example, a unit region $60_1$ to a unit region $60_N$. In the following, the n-th (note that n=1, 2, . . . , N) unit region 60 is represented as a unit region $60_n$. In the present embodiment, N=23040. The transmissive regions 61 and the nontransmissive regions 62 of the barrier unit 6 are alternately arranged in the X direction. In the following, repeating cycles are assumed to be barrier regions, each of the barrier regions is assumed to be composed of a predetermined number of the unit regions 60 shown in FIG. 5, and the width of each of the barrier regions is assumed to be a barrier pitch. In two nontransmissive regions which sandwich one transmissive region, the distance between the middle point of one nontransmissive region and the middle point of the other nontransmissive region is the barrier pitch.

As shown in FIG. 6, since the transmissive regions 61 and the nontransmissive regions 62 of the barrier unit 6 are provided, the left eye image P1 will be seen only with the viewer's left eye through the transmissive regions 61. That is, the right eye image P2 is blocked by the nontransmissive regions 62 and will not be seen with the viewer's left eye. Similarly, the right eye image P2 will be seen only with the viewer's right eye through the transmissive regions 61. That is, the left eye image P1 is blocked by the nontransmissive regions 62 and will not be seen with the viewer's right eye. Note that, to simplify the illustration, the relationship between the lines of sight of the viewer's right eye and the barrier unit 6 is omitted in FIG. 6. In this structure, it is possible, by forming parallax by the barrier unit 6, to allow the viewer who is in a predetermined position and looking at the display surface 4S of the display unit 4 to see a three-dimensional image with his or her naked eyes. As described above, the barrier unit 6 can switch between the transmissive region 61 and the nontransmissive region 62 or can adjust or change the width of each of the transmissive region 61 and the nontransmissive region 62. Therefore, the barrier unit 6 can switch between a three-dimensional display mode of forming parallax and allowing the viewer to see a display image of the display unit 4 as a stereoscopic display image, and a two-dimensional display mode of not forming parallax but allowing the viewer to see a display image of the display unit 4 as a planar display image. In the two-dimensional display mode, all the regions of barrier unit 6 are switched to the transmissive regions 61, and a display image is transmitted through all the regions.

Figure 7:
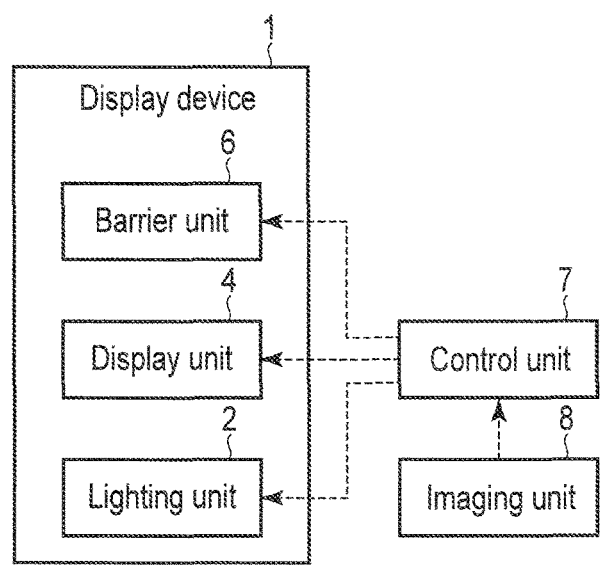
FIG. 7 is a block diagram showing an example of the functional structure of the display device of the embodiment.

FIG. 7 is a block diagram showing an example of the functional structure of the display device of the present embodiment. As shown in FIG. 7, the control unit 7 controls the lighting unit 2, the display unit 4 and the barrier unit 6 of the display device 1. Further, the control unit 7 comprises a position information acquisition means of calculating the position information of the viewer based on the image information acquired by the imaging unit 8. The control unit 7 displays a three-dimensional image by controlling the lighting unit 2, the display unit 4 and the barrier unit 6 based on the position information calculated by an externally provided or internal provided position information acquisition means. Note that, although the position information of the viewer is derived from the image captured by the imaging unit 8 in the present embodiment, the position information acquisition method is not limited to this method. For example, the position information of the viewer may be acquired by a temperature sensor such as an infrared ray sensor, an audio sensor such as a microphone, an optical sensor, or the like, or a combination thereof.

The externally provided or internal provided position information acquisition means of the control unit 7 detects or measures the position of the viewer such as the positions of the right eye and the left eye of the viewer in the image from the image information of the imaging unit 8, and calculates x, y, and z coordinates of the position of the viewer with respect to the display surface 4S. Based on the position information of the viewer calculated by the position information acquisition means, the control unit 7 controls the turn-on or turn-off, the amount of light, and the intensity of light of the lighting unit 2 of the display device 1, the display image of the display unit 4, and the transmission region 61 and the non-transmission region 62 of the barrier unit 6.

Figures 8A, 8B:
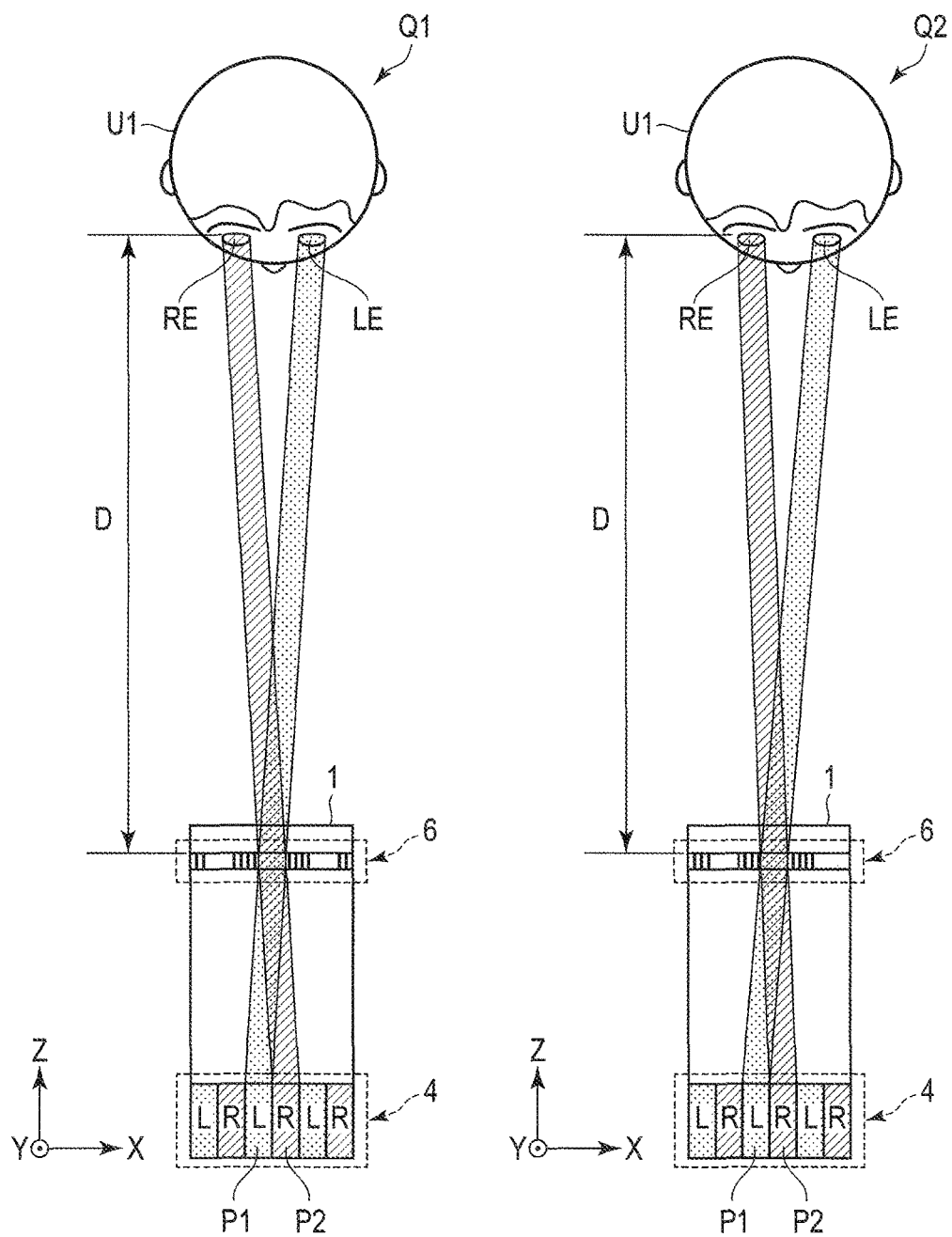
FIG. 8A and FIG. 8B are conceptual diagrams showing a method of controlling the display device when the viewer moves right or left with respect to the display surface.

FIG. 8A and FIG. 8B are conceptual diagrams showing a method of controlling the display device when the viewer moves right or left with respect to the display surface of the display device. The externally provided or internally provided position information acquisition means of the control unit 7 calculates the positions of the right eye RE and the left eye LE of the viewer U1 and the distance from the viewer U1 to the display device 1 when the viewer U1 is in the initial state Q1. Subsequently, according to the positions of the right eye RE and the left eye LE and the distance to the display device 1 which are calculated by the position information acquisition means, the control unit 7 determines image display in the display unit 4. For example, the control unit 7 determines such a display method of displaying the left eye image P1 and the right eye image P2 alternately in the X direction as shown in FIG. 4. Note that the display method of the left eye image P1 and the right eye image P2 is not limited to any particular method but may be any display method as long as the display method can secure parallax between the left eye LE and the right eye RE of the viewer U1. Then, the control unit 7 determines the transmissive region 61 and the nontransmissive region 62 of the barrier unit 6, and switches each of the unit regions $60_1$ to $60_N$ shown in FIG. 5 between the transmissive region 61 and the nontransmissive region 62. In this way, for example, as shown in FIG. 8, the left eye image P1 is seen with the left eye LE of the viewer U1 through the barrier unit 6, while the right eye image P2 is seen with the right eye RE of the viewer U1 through the barrier unit 6. Note that, although the switch operation between the transmissive region 61 and the nontransmissive region 62 of the barrier unit 6 and the switch operation between the left eye image P1 and the right eye image P2 of the display unit 4 are synchronously performed in the present embodiment, the order of these switch operations are not limited to the above-described order.

Next, in a state Q2 where the viewer U1 moves in the X direction, the externally provided or internally provided position information acquisition means of the control unit 7 calculates the position of the viewer from the positions of the right eye RE and the left eye LE of the viewer U1 based on the image data acquired by the imaging unit 8. Then, the control unit 7 changes the display of the left eye image P1 and the right eye image P2 according to the positions of the right eye RE and the left eye LE which are calculated by the position information acquisition means. That is, in the state Q2 shown in FIG. 8B, the control unit 7 controls the switch operation between the transmissive region 61 and the nontransmissive region 62 of the barrier unit 6 in such a manner as to allow the viewer U1 to see the right eye image P2 from the current position of the right eye RE and to see the left eye image P1 from the current position of the left eye LE, and allows the viewer to see a display image as a three-dimensional image even in the state of Q2. Note that, as the transmissive region 61 and the nontransmissive region 62 of the barrier unit 6 are switched to each other, the pixel column of the left eye image P1 and the pixel column of the right eye image P2 may be switched to each other substantially simultaneously.

Figure 9:
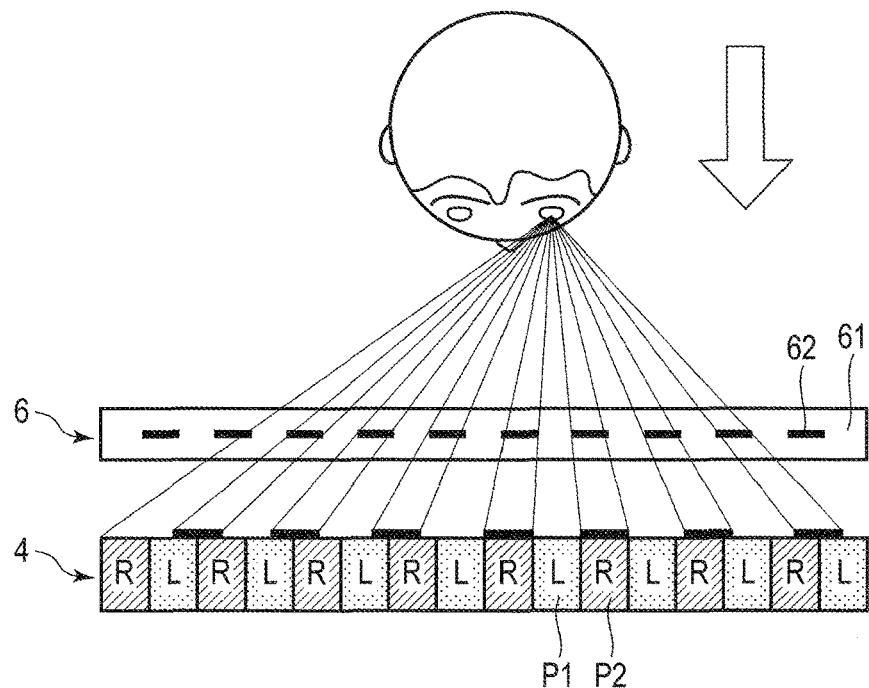
FIG. 9 is an explanatory diagram showing the relationship between the lines of sight of the viewer and the barrier unit when the viewer moves forward or backward with respect to the display surface.

FIG. 9 is an explanatory diagram showing the relationship between the lines of sight of the viewer and the barrier unit when the viewer moves forward or backward with respect to the display surface. As shown in FIG. 9, when the viewer moves forward or backward, the lines of sight of the viewer will be deviated from the transmissive regions 61 and the nontransmissive regions 62 provided between the viewer and the display image of the display unit 4. Therefore, a part of the right eye image P2 will be seen with the viewer's left eye, and a crosstalk will occur.

Figure 10:
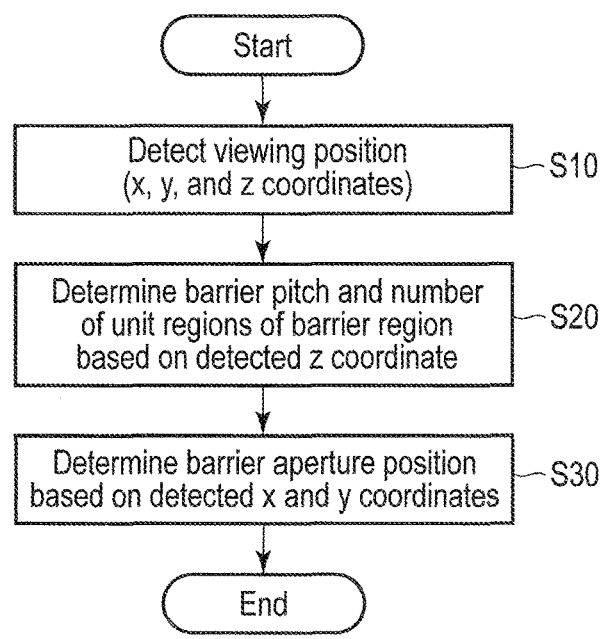
FIG. 10 is a flowchart showing an example of the control method of the display device of the embodiment.
Figure 11A:
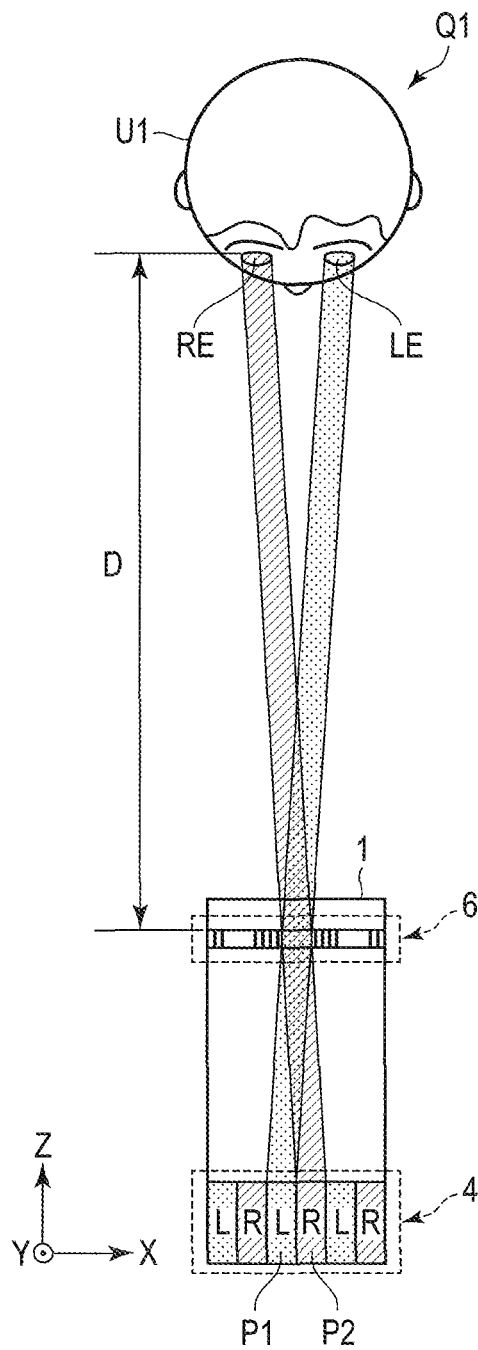
FIG. 11A and FIG. 11B are conceptual diagrams showing a method of controlling the display device when the viewer moves forward or backward with respect to the display surface.
Figure 11B:
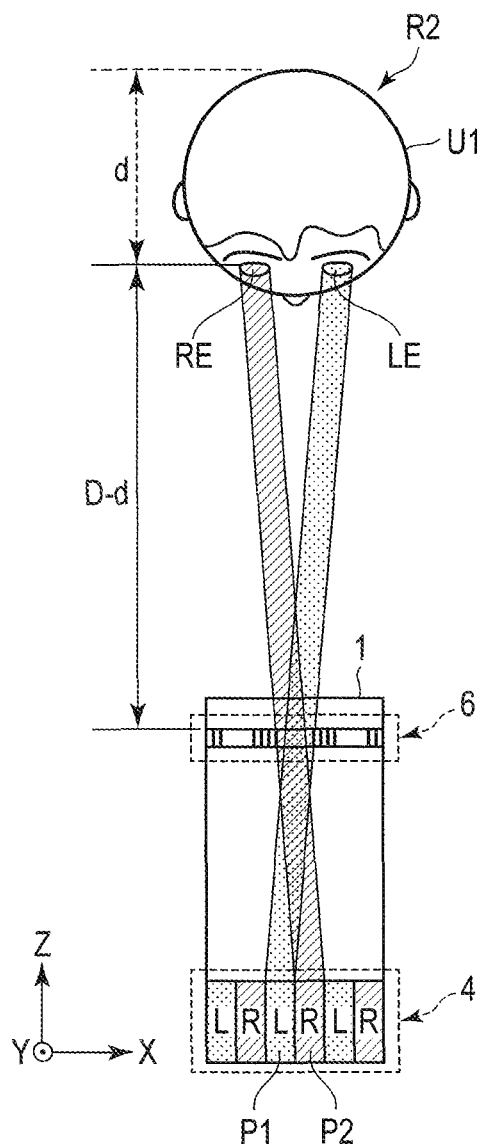

Next, a control method of the barrier unit 6 which can prevent a crosstalk will be described with reference to FIGS. 10, 11A and 11B. FIG. 10 is a flowchart showing an example of the control method of the display device of the embodiment. FIGS. 11A and 11B are conceptual diagrams showing the method of controlling the display device when the viewer moves forward or backward with respect to the display surface. Note that, in FIG. 11A and FIG. 11B, the viewer U1 is assumed to be in the center of the display surface 4S (refer to FIG. 4) of the display unit 4.

First, the externally provided or internally provided position information acquisition means of the control unit 7 detects the viewing position of the viewer from the image data acquired by the imaging unit 8 (step S10). Here, the viewing position of the viewer indicates the position of the face (such as, the center of the right eye RE and the left eye LE) which can be specified by the positions of the right eye and the left eye of the viewer U1 or the like. Based on the assumption that the center of the display surface 4S of the display unit 4 is the coordinate origin, the position information acquisition means calculates x, y and z coordinates of the viewing position.

Subsequently, the control unit 7 calculates the distance between the viewer U1 and the barrier unit 6, that is, the distance between the center of the right eye RE and the left eye LE, and the barrier unit 6 in the perpendicular direction to the display surface in the present embodiment.

Next, based on the distance between the viewer U1 and the barrier unit 6 which is calculated in step S10, the barrier pitch and the number of the barrier regions are determined (step S20). Here, when the viewer sees the display image in the display unit 4, a reference distance between the viewer U1 and the barrier unit 6 is referred to as an optimum distance D. The optimum distance D is the distance between the viewer U1 in a predetermined reference position and the barrier unit 6 and is the distance in the direction (Z direction) perpendicular to the display surface 4S. As the optimum distance D, a predetermined value is stored in the control unit 7 beforehand. FIG. 11A is an explanatory diagram schematically showing the positional relationship between the viewer U1 and the display device 1 when the viewer U1 is at the optimum distance D from the display surface 4S.

In a case where the viewer U1 is in the reference position, a barrier pitch X1 is calculated by the following equation (1):

$$X1 = 2pE/(p+E) \quad (1)$$

where p is the pixel pitch of the pixel 50; and E is the between-eye distance (the distance between the right eye RE and the left eye LE of the viewer).

The barrier pitch X1 is assumed to be the barrier pitch 65 shown in FIG. 5. Further, the barrier pitch 65 corresponds to the barrier pitch to be set when the viewer is at the optimum distance D. As shown in FIG. 5, the barrier region having the barrier pitch 65 is composed of 18 unit regions 60, and the width of the barrier region is 18 times the width of the unit region 60. Further, these 18 unit regions 60 consist of four of nine unit regions 60 of one of two nontransmissive regions 62 which sandwich one transmissive region 61, five of nine unit regions 60 of the other of the two nontransmissive regions 62, and nine unit regions 60 of the transmissive region 61 which is sandwiched between these two nontransmissive regions 62.

Next, as shown in FIG. 11B, when the viewer U1 moves forward from the reference position to the display unit 4 and becomes closer from the optimum distance D by a distance d, the control unit 7 acquires as the position information of the viewer U1, a distance (D−d) between the reference position and the viewer U1 in the direction (Z direction) perpendicular to the display surface 4S from the position information acquisition means. In a case where the viewer U1 moves closer to the display unit 4 from the reference position by the distance d, a barrier pitch X2 is calculated by the following equation (2).

$$X2 = 2pE/(pD/(D-d)+E) \quad (2)$$

Further, the control unit 7 calculates a cumulative deviation Xa of the barrier pitch X2 by the following equation (3).

$$Xa = (X2-X1) \times B \quad (3)$$

The cumulative deviation Xa is obtained by multiplication of the difference between the barrier pitch X1 of when the viewer U1 is in the reference position and the barrier pitch X2 of when the viewer U1 moves closer to the display surface 4S by the distance d (X2−X1), with the number B of the barriers (the total number of the barrier regions each of which is indicated by the barrier pitch 65).

The control unit 7 compares the cumulative deviation Xa of the barrier pitch X2 with the width W of one first electrode 122 shown in FIG. 2 (the width of the unit region 60), and calculates the maximum value of n1 which satisfies the following inequality (4) (note that $n_1$=1, 2, . . . , N).

$$Xa > n_1 W \quad (4)$$

For example, $n_1$=1 means that the viewer U1 moves closer to the display surface 4S by the distance d which is converted into the width of one first electrode 122 by the above equations and inequality (1) to (4). In this case, the control unit 7 sets the barrier pitch of the barrier region in the center of the barrier unit 6 to a barrier pitch 65a which is shorter than the barrier pitch 65, and sets the barrier pitch of the other barrier regions to the barrier pitch 65. In this way, it is possible to prevent a crosstalk associated with a forward movement of the viewer with respect to the display surface.

Figure 12:
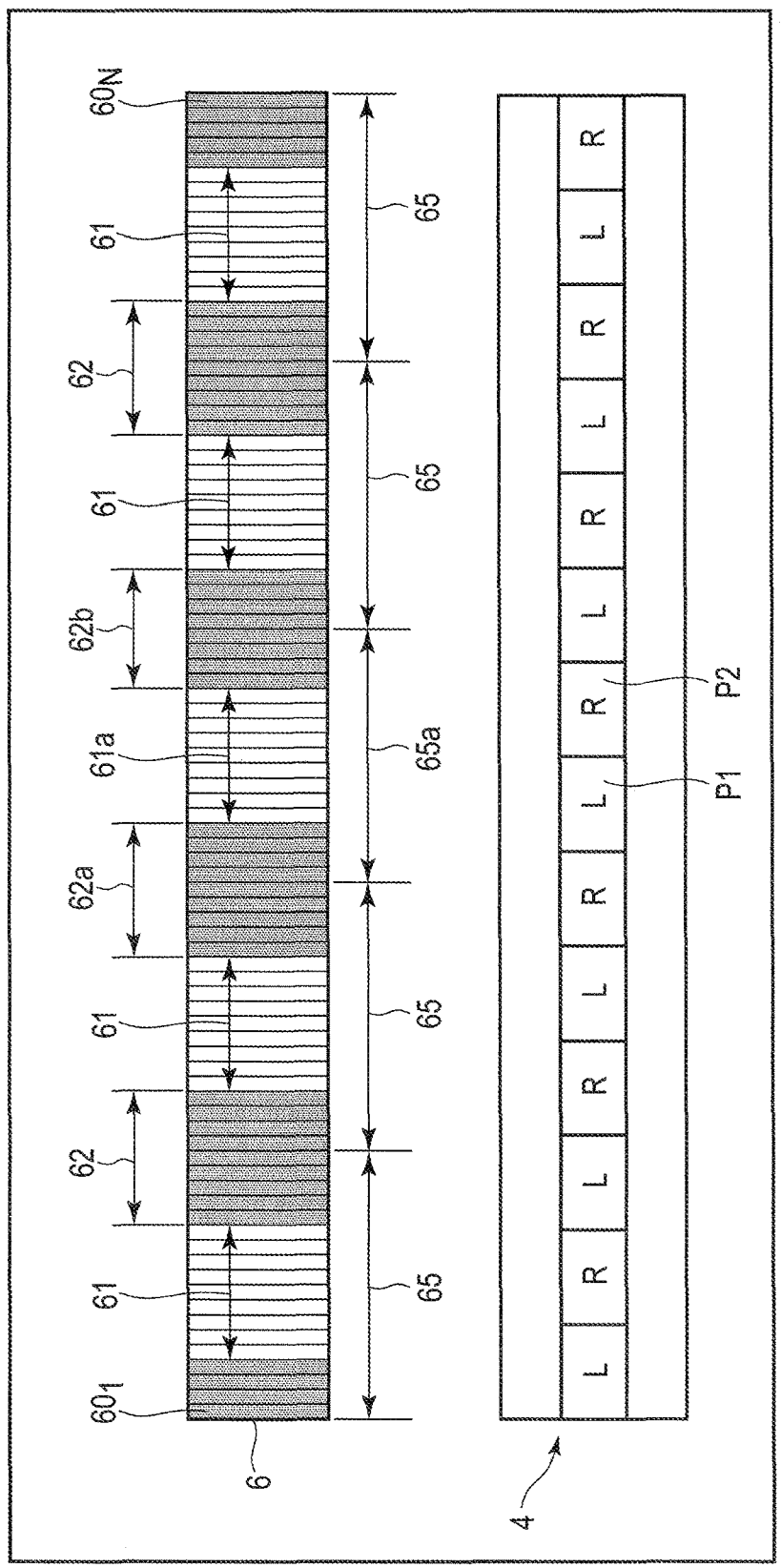
FIG. 12 is a sectional diagram showing the sectional structures of the barrier unit and the display unit when the viewer is at a distance shorter than an optimum distance.

Here, the barrier region having the barrier pitch 65a is composed of 17 unit regions 60 as shown in FIG. 12. That is, the width of the barrier region is 17 times the width of the unit region 60. Further, these 17 unit regions 60 consist of four of nine unit regions 60 of a nontransmissive region 62a which sandwiches a transmissive region 61a, four of eight unit regions 60 of a nontransmissive region 62b which sandwiches the transmissive region 61a together with the nontramsissive region 62a, and nine unit regions 60 of the transmissive region 61a which is sandwiched between the transmissive regions 62a and the nontransmissive regions 62b. As described above, the nontransmissive region 62a which is adjacent to the barrier region having the barrier pitch 65 and the barrier region having the barrier pitch 65a consists of nine unit regions 60, whereas the nontransmissive region 62b on the other side consists of eight unit regions, that is, the nontransmissive region 62b includes one unit region less than the nontransmissive region 62 which is sandwiched between the barrier regions having the barrier pitch 65.

Further, when the viewer U1 moves away from the display unit 4, a barrier pitch 65b is appropriately set, and a barrier pitch X3 is obtained by the above equation (2) where −d is replaced by +d. The cumulative deviation Xb of the barrier pitch X3 is obtained by multiplication of the difference between the barrier pitch X1 of when the viewer U1 is in the reference position, and the barrier pitch X3 of when the viewer U1 moves away from the display surface by the distance d (X1−X3), with the number B of the barriers (the total number of the barrier regions each of which is indicated by the barrier pitch 65).

The control unit 7 compares the cumulative deviation Xb of the barrier pitch X3 with the width W of one first electrode 122 shown in FIG. 2 (the width of the unit region 60), and calculates the maximum value of $n_1$ which satisfies the following inequality (4) (note that $n_1$=1, 2, . . . , N). For example, in the case of n1=1, the control unit 7 sets the barrier pitch of the barrier region in the center of the barrier unit 6 to a barrier pitch 65b which is longer than the barrier pitch 65, and sets the barrier pitch of the other barrier regions to the barrier pitch 65.

Figure 13:
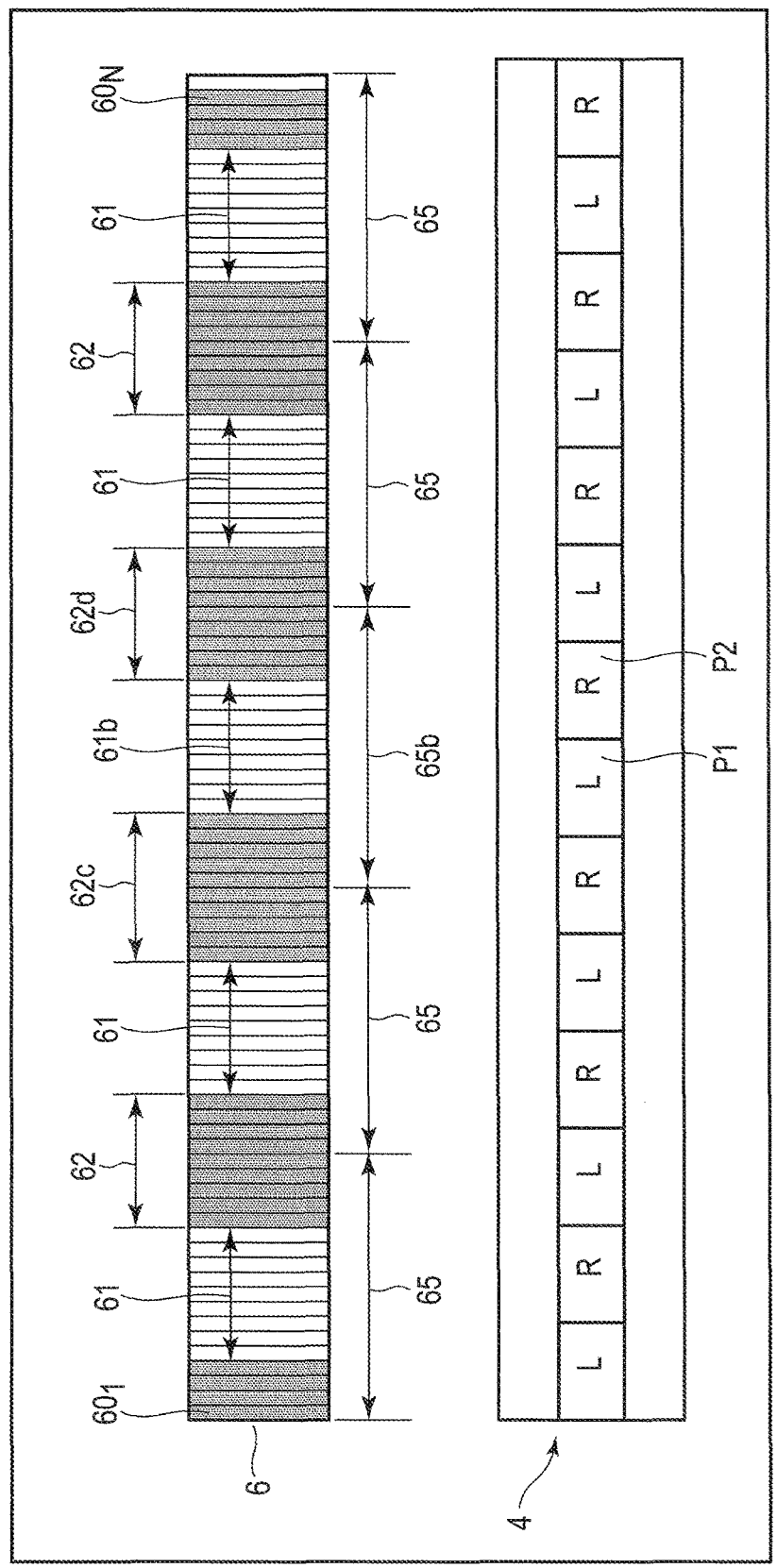
FIG. 13 is a sectional diagram showing the sectional structures of the barrier unit and the display unit when the viewer is at a distance longer than the optimum distance.

The barrier region having the barrier pitch 65b include one unit region 60 less than the barrier region having the barrier pitch 65. That is, as shown in FIG. 13, the width of the barrier region having the barrier pitch 65b is 19 times the width of the unit region 60. Further, these 19 unit regions 60 consist of five of ten unit regions 60 of a nontransmissive region 62c which sandwiches a transmissive region 61b, five of nine unit regions 60 of a nontransmissive region 62d which sandwiches the transmissive region 61b together with the nontransmissive region 62c, and nine unit regions 60 of the transmissive region 61b which is sandwiched between the transmissive region 62c and the nontransmissive region 62d. The transmissive region 62c which is adjacent to the barrier region having the barrier pitch 65 and the barrier region having the barrier pitch 65b includes ten unit regions, whereas the nontransmissive region 62d on the other side includes nine unit regions. The nontransmissive region 62c include one unit region 60 more than the nontrasmissive region 62 which is sandwiched between the barrier regions having the barrier pitch 65.

In a manner similar to that of the above-described case where the viewer moves closer to the display surface from the optimum distance, it is possible to prevent a crosstalk by appropriately arranging the barrier region having the barrier pitch 65 and the barrier region having the barrier pitch 65b in the barrier unit 6.

Note that the numbers of the unit regions 60 of the barrier region having the barrier pitch 65, the barrier region having the barrier pitch 65a, and the barrier region having the barrier pitch 65b are not necessarily limited to 18, 17, and 19 but may be appropriately determined according to the pixel pitch p of the display unit, the optimum distance D, and the like.

Figure 14:
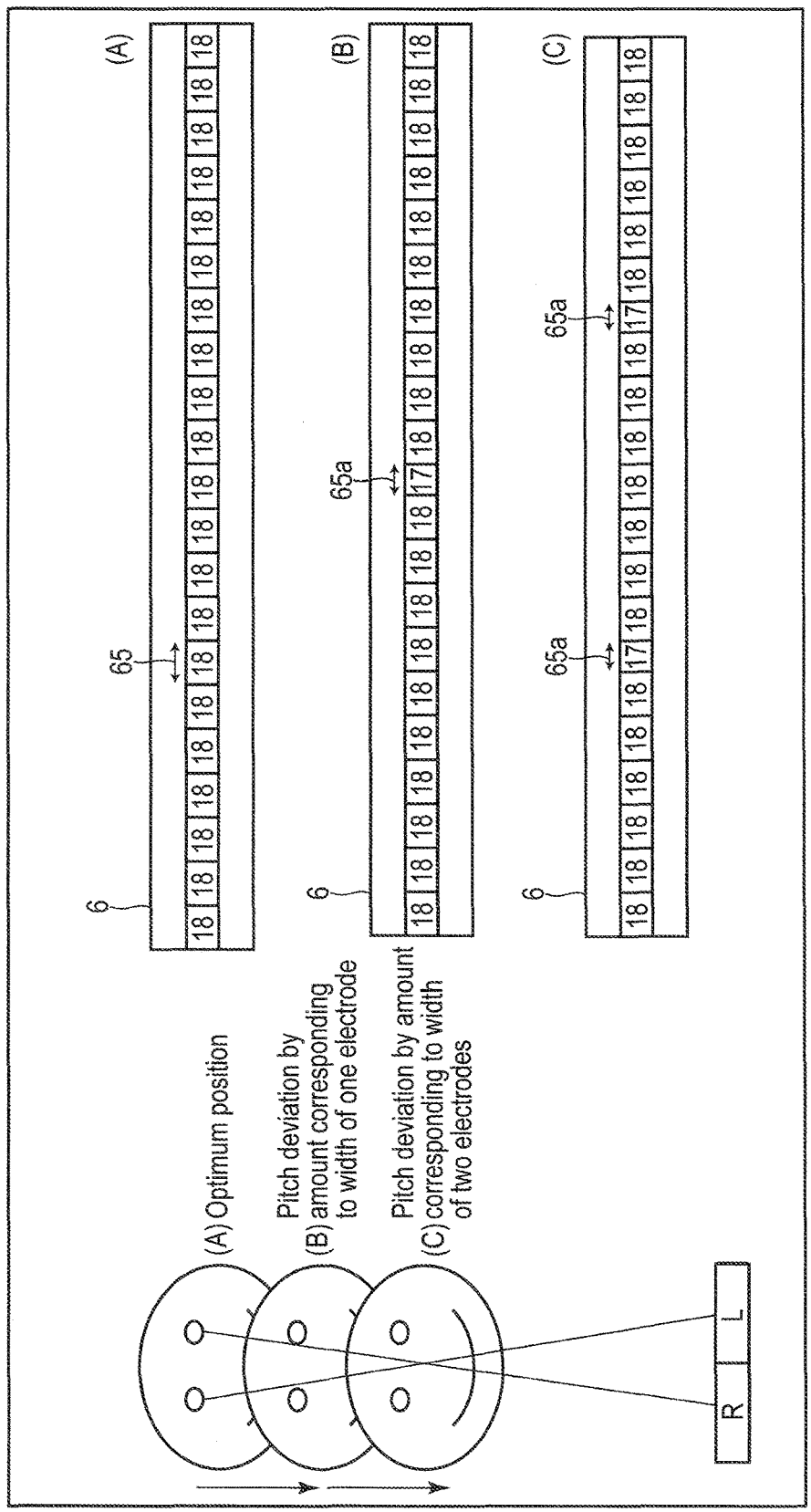
FIG. 14 is a diagram showing a method of controlling the barrier unit when the viewer moves forward to the display surface from the optimum distance.
Figure 15:
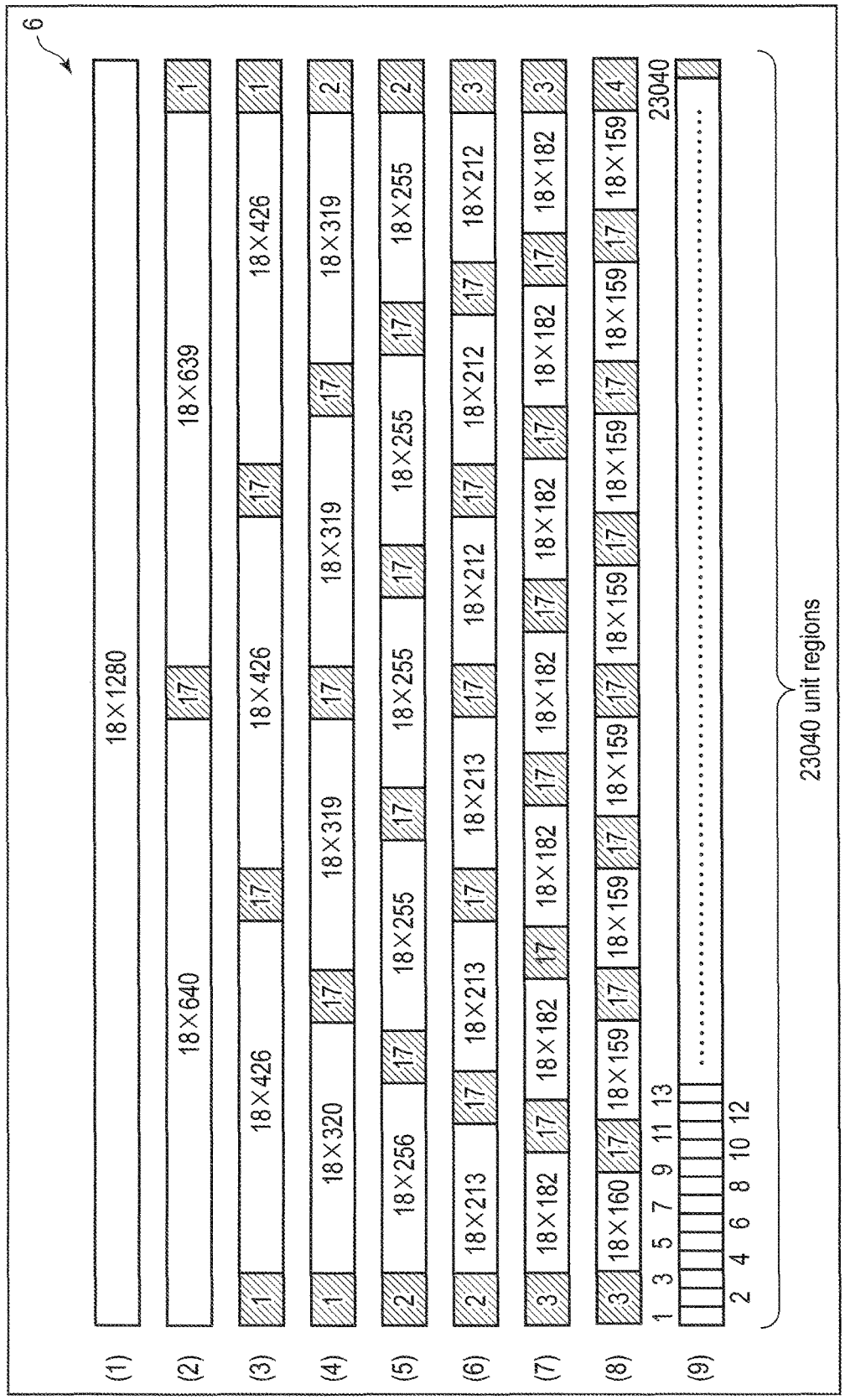
FIG. 15 is another diagram showing the method of controlling the barrier unit when the viewer forward to the display surface from the optimum distance.

Next, an specific example of the arrangement of the barrier region having the barrier pitch 65 and the barrier region having the barrier pitch 65a of the barrier unit 6 when the viewer U1 is at the optimum distance D from the display surface 4S and when the viewer U1 moves closer to the display surface 4S by the distance d will be described. FIG. 14 shows an example of the arrangement of the barrier region having the barrier pitch 65 and the barrier region having the barrier pitch 65a of the barrier unit 6 when the viewer moves closer to the display surface. FIG. 15 shows the entire barrier unit 6 corresponding to the arrangement described with reference to FIG. 14, in particular, the arrangement and the number of the barrier regions having the barrier pitch 65a in the barrier unit 6, and the arrangement of the barrier region having the barrier pitch 65 and the barrier region having the barrier pitch 65a when the viewer U1 moves from the reference position by a distance corresponding to $n_1$ ($n_1$=1 to 7). Further, in FIG. 15, the numbers (2) to (8) added at one end of the barrier unit 6 indicate the numbers of the unit regions 60 which are always displayed in black, and the barrier unit 6 shown in (9) indicates that the barrier unit 6 consists of 23040 unit regions 60.

FIG. 14 (A) and FIG. 15 (1) show the arrangement of the barrier region having a predetermined barrier pitch in the barrier unit 6 when the viewer is in the reference position. When the viewer U1 is in the reference position, the barrier regions having various pitches are arranged such that the barrier regions having various pitches include the same number of the unit regions 60, respectively. In this way, it becomes possible to prevent a crosstalk and to allow the viewer to see a display image of the display unit 4 as an excellent three-dimensional image. In the present embodiment, it is possible to prevent a crosstalk by setting all the barrier regions having various barrier pitches as the barrier region having the barrier pitch 65 and consisting of 18 unit regions 60.

FIG. 14 (B) and FIG. 15 (2) show the arrangement of the barrier region having the barrier pitch 65 and the barrier region having the barrier pitch 65a in the barrier unit 6 when the viewer U1 moves forward from the reference position and becomes closer to the display unit 4 from the optimum distance by a distance corresponding to $n_1$=1. According to the above equations and inequality (1) to (4), the cumulative deviation Xa of the barrier pitch X2 is greater than the width of the unit region 60 corresponding to the width of one first electrode 122. In this case, as shown in FIG. 14 (B) and FIG. 15 (2), the barrier unit 6 consists of a plurality of barrier regions having the barrier pitch 65 and one barrier region having the barrier pitch 65a.

Further, the control unit 7 sets the outermost unit region $60_1$ or $60_N$ of the barrier unit 6 shown in FIG. 15 (2) as the nontransmissive region. In this way, among a plurality of nontransmissive regions 62 such as those shown in FIG. 5, a nontransmissive region 62 such as the nontransmissive region 62b shown in FIG. 12 which is smaller than the other nontransmissive regions 62 is formed. In the present embodiment, when $n_1$=1, a barrier region having the barrier pitch 65a and consisting of 17 unit regions 60 is arranged in the center of the barrier unit 6, and in the positions other than the position of the barrier unit having the barrier pitch 65a, barrier regions, each having the barrier pitch 65 and consisting of 18 unit regions 60, are arranged.

FIG. 14 (C) and FIG. 15 (3) show the arrangement of the barrier region having the barrier pitch 65 and the barrier region having the barrier pitch 65a in the barrier unit 6 when the viewer U1 moves further closer to the display unit 4 from the reference position and the cumulative deviation Xa of the barrier pitch X2 becomes greater than the width of two first electrodes 122, that is, when the viewer U1 moves closer to the display unit 4 by a distance corresponding to $n_1$=2 which is derived from the above inequality (4). As shown in FIG. 14 (C) and FIG. 15 (3), the barrier unit 6 consists of a plurality of barrier regions having the barrier pitch 65 and two barrier regions having the barrier pitch 65a.

Further, the control unit 7 sets the outermost unit regions $60_1$ and $60_N$ of the barrier unit 6 as the nontransmissive region as shown in FIG. 15 (3). In this way, among a plurality of nontransmissive regions 62, a nontransmissive region 62 such as the nontransmissive region 62b shown in FIG. 12 which is smaller than the other nontransmissive region 62 is formed. In the present embodiment, when $n_1$=2, these barrier regions having the barrier pitch 65a are symmetrical arranged with respect to the center of the barrier unit 6.

As shown in FIG. 15 (4) to (8), when $n_1$=3 or more, in a manner similar to the case of $n_1$=1 or 2, the number of the barrier regions having the barrier pitch 65a is obtained by the equations and inequality (1) to (4), and the barrier regions having the barrier pitch 65 and the barrier regions having the barrier pitch 65a are arranged in the barrier unit 6. Further, the number of the outermost unit regions of the barrier unit 6 which are always set as the nontransmissive regions is proportional to the number of the barrier regions having the barrier pitch 65a. In the present embodiment, the barrier regions having the barrier pitch 65a are symmetrical with respect to the center of the barrier unit 6. Here, the above-described arrangement method is in no way restrictive, and to arrange a plurality of barrier regions having the barrier pitch 65a, the barrier regions having the barrier pitch 65a may also be arranged in the X direction at regular intervals.

As described above, the number of the unit regions 60 in the barrier region having the barrier pitch 65 and the number of the unit regions 60 in the barrier region having the barrier pitch 65a are the same as each other in the transmissive region but are different from each other in the nontransmissive region. Therefore, the aperture ratio of the barrier region varies between the barrier region having the barrier pitch 65 and the barrier region having the barrier pitch 65a. For example, in the preset embodiment, the aperture ratio of the barrier region having the barrier pitch 65 is 9/18 (=0.5), while the aperture ratio of the barrier region having the barrier pitch 65a is 9/17 (=0.53), and as is evident from the above, the aperture ratio varies between the barrier region having the barrier pitch 65 and the barrier region having the barrier pitch 65a. Such a difference in aperture ratio between barrier regions having different barrier pitches may cause variations in brightness, and such variations in brightness may be perceived as streaks, in particular, in the position of the barrier region having the barrier pitch 65a.

To prevent streaks or variations in brightness associated with differences in aperture ratio among barrier regions, in the present embodiment, one or two unit regions 60 within the transmissive region having the barrier pitch 65a are alternately displayed in a transmissive display mode and in a nontransmissive display mode on a frame-by-frame basis, that is, are alternately displayed in a white display mode and in a black display mode on a frame-by-frame basis.

Figure 16:
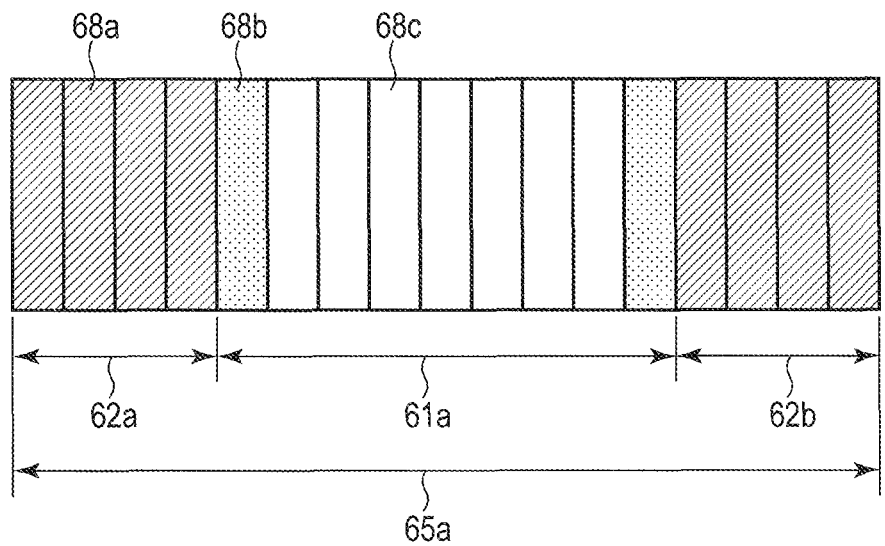
FIG. 16 is an explanatory diagram showing a transmissive region and a nontransmissive region of the barrier unit when the viewer is at a distance shorter than the optimum distance.

FIG. 16 is a diagram showing the barrier region which consists of 17 unit regions 60 and has the barrier pitch 65a. In the drawing, a unit region 68a is a unit region 60 within the nontransmissive region, a unit region 68b is a unit region 60 which is alternately displayed in the white display mode and in the black display mode on a frame-by-frame basis, and a unit region 68c is a unit region 60 within the transmissive region.

At the boundary of the transmissive region and the nontransmissive region within the barrier region having the barrier pitch 65a, the unit region 60 on the transmissive region 61 side is used as the unit region 68b. As the display of the unit region 68b is switched between the white display and the black display, the width of the nontransmissive region and the width of the transmissive region within the barrier region having the barrier pitch 65a are changed from one frame to another, and the aperture ratio of the barrier region having the barrier pitch 65a is changed from one frame to another, accordingly. For example, if one unit region 68b in the barrier region having the barrier pitch 65a is alternately displayed in the white display mode and in the black display mode on a frame-by-frame basis, the barrier region having the barrier pitch 65a will have an aperture ratio of 9/17 in one frame where the transmissive region 61 consists of nine unit regions 60 and the nontransmissive region 62 consists of eight unit regions 60, and will have an aperture ratio of 8/17 in the next frame where the transmissive region 61 consists of eight unit regions 60 and the nontransmissive region 62 consists of nine unit regions 60. In this case, the brightness of the barrier region having the barrier pitch 65a varies from one frame to another, but since the viewer U1 perceives an average of variations in brightness over frames, the viewer U1 perceives brightness corresponding to brightness of when the barrier region having the barrier pitch 65a has an aperture ratio of 8.5/17 (=0.5). Since the barrier region having the barrier pitch 65 always has an aperture ratio of 9/18 (=0.5), when three-dimensional images are displayed to the viewer U1 over a several frames, the difference in the aperture ratio between the barrier region having the barrier pitch 65 and the barrier region having the barrier pitch 65a will not be perceived, or the variations in the brightness or the streaks associated with the difference in the aperture ratio will not be perceived.

Figure 17:
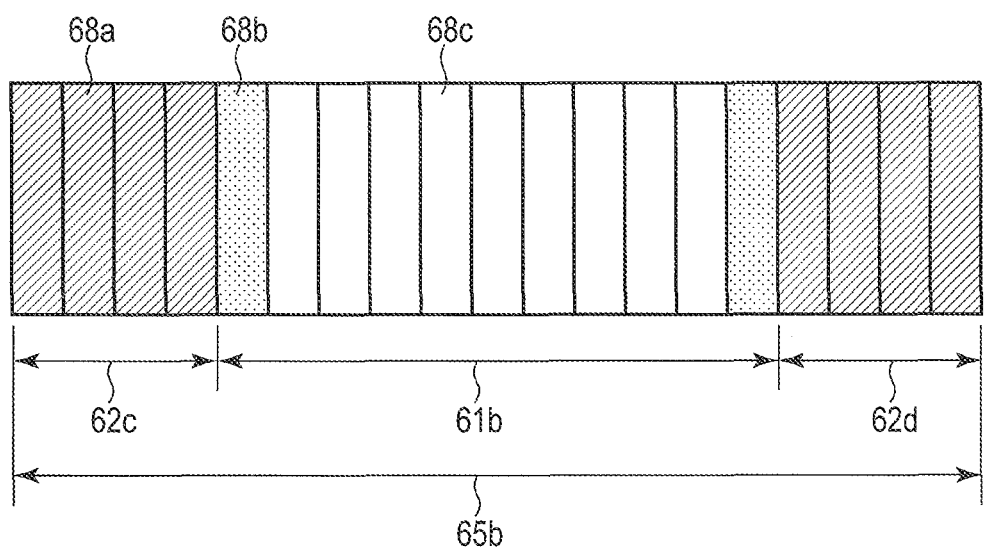
FIG. 17 is an explanatory diagram showing a transmissive region and a nontransmissive region of the barrier unit when the viewer is at a distance longer than the optimum distance.

FIG. 17 is a diagram showing the barrier region which consists of 19 unit regions 60 and has the barrier pitch 65b. In the drawing, a unit region 68a is a unit region 60 within the nontransmissive region, a unit region 68b is a unit region 60 which is alternately displayed in the white display mode and in the black display mode on a frame-by-frame basis, and a unit region 68c is a unit region 60 within the transmissive region.

At the boundary of the transmissive region and the nontransmissive region of the barrier region having the barrier pitch 65a, the unit region 60 on the nontransmissive region side is used as the unit region 68b. As the display of the unit region 68b is switched between the white display and the black display, the width of the nontransmissive region and the width of the transmissive region within the barrier region having the barrier pitch 65b are changed from one frame to another, and the aperture ratio of the barrier region having the barrier pitch 65b is changed from one frame to another, accordingly. For example, if one unit region 68b in the barrier region having the barrier pitch 65b is alternately displayed in the white display mode and in the black display mode on a frame-by-frame basis, the barrier region having the barrier pitch 65b will have an aperture ratio of 9/19 in one frame where the transmissive region 61 consists of nine unit regions 60 and the nontransmissive region 62 consists of ten unit regions 60, and will have an aperture ratio of 10/19 in the next frame where the transmissive region 61 consists of ten unit regions 60 and the nontransmissive region 62 consists of nine unit regions 60. In this case, the brightness of the barrier region having the barrier pitch 65b varies one frame to another, but since the viewer U1 perceives an average of the variations in the brightness over the frames, the viewer U1 perceives brightness corresponding to brightness of when the barrier region having the barrier pitch 65b has an aperture ratio of 9.5/19 (=0.5). Since the barrier region having the barrier pitch 65 always has an aperture ratio of 9/18 (=0.5), when the three-dimensional images are displayed to the viewer U1 over a several frames, the difference in the aperture ratio between the barrier region having the barrier pitch 65 and the barrier region having the barrier pitch 65b will not be perceived, or the variations in the brightness or the streaks associated with the difference in the aperture ratio will not be perceived.

Next, an example of a drive unit which drives the above-described barrier unit 6 will be described with reference to FIG. 18. A drive unit 9 comprises a shift resistor 11 which receives a drive signal from the control unit 7, a first latch 12 which sequentially stores a signal from the shift resistor 11, and a second latch/buffer 13 which temporarily stores a drive signal for the barrier unit 6 and outputs the drive signal to the barrier unit 6. Each of the shift resistor circuit, the latch circuit, and the buffer circuit is polysilicon, amorphous silicon, or the like and is formed on the first substrate 121 of the barrier unit 6. Based on the position information (x, y and z coordinates) of the viewer U1, the control unit 7 sequentially outputs to each of the plurality of first electrodes 122 shown in FIG. 2, a drive signal to switch or not to switch between the transmissive region 61 and the nontransmissive region 62. Then, the position information and the drive signal of the first electrode 122 are stored in the latch circuit, and the buffer circuit absorbs the time difference and outputs the drive signal to the barrier unit 6. In this way, the drive unit 9 can drive the unit regions $60_1$ to $60_N$ corresponding to the respective first electrodes 122 while reducing the time differences among the unit regions $60_1$ to $60_N$ as much as possible. In the present embodiment, with respect to the 23040 unit regions 60, that is, 23040 first electrodes 122, the above-described drive unit can appropriately arrange the transmissive region and the nontransmissive region in the barrier unit 6. Further, also in a drive operation where the display of the unit region at the end of the transmission region of the barrier region having the barrier pitch 65a is switched between the white display and the black display on a frame-by-frame basis, the drive operation can be performed by the present drive unit, and thus any additional circuit will be required and the circuit size will be maintained. Still further, even if the pitch of the first electrode 122 is shorter than the pixel pitch of the display device 1, it is still possible to appropriately switch each of the first electrodes 112 of the barrier unit 6 between the transmissive region and the nontransmissive region based on the position information of the viewer by forming a circuit such as a shift resister circuit on the first substrate 121 of the barrier unit 6. For example, the pitch of the shorter-pitch first electrode 122 is 5 um to 20 um, and the above-described structure is effective when the number of the first electrodes 122 is 8000 or more.

Figure 19:
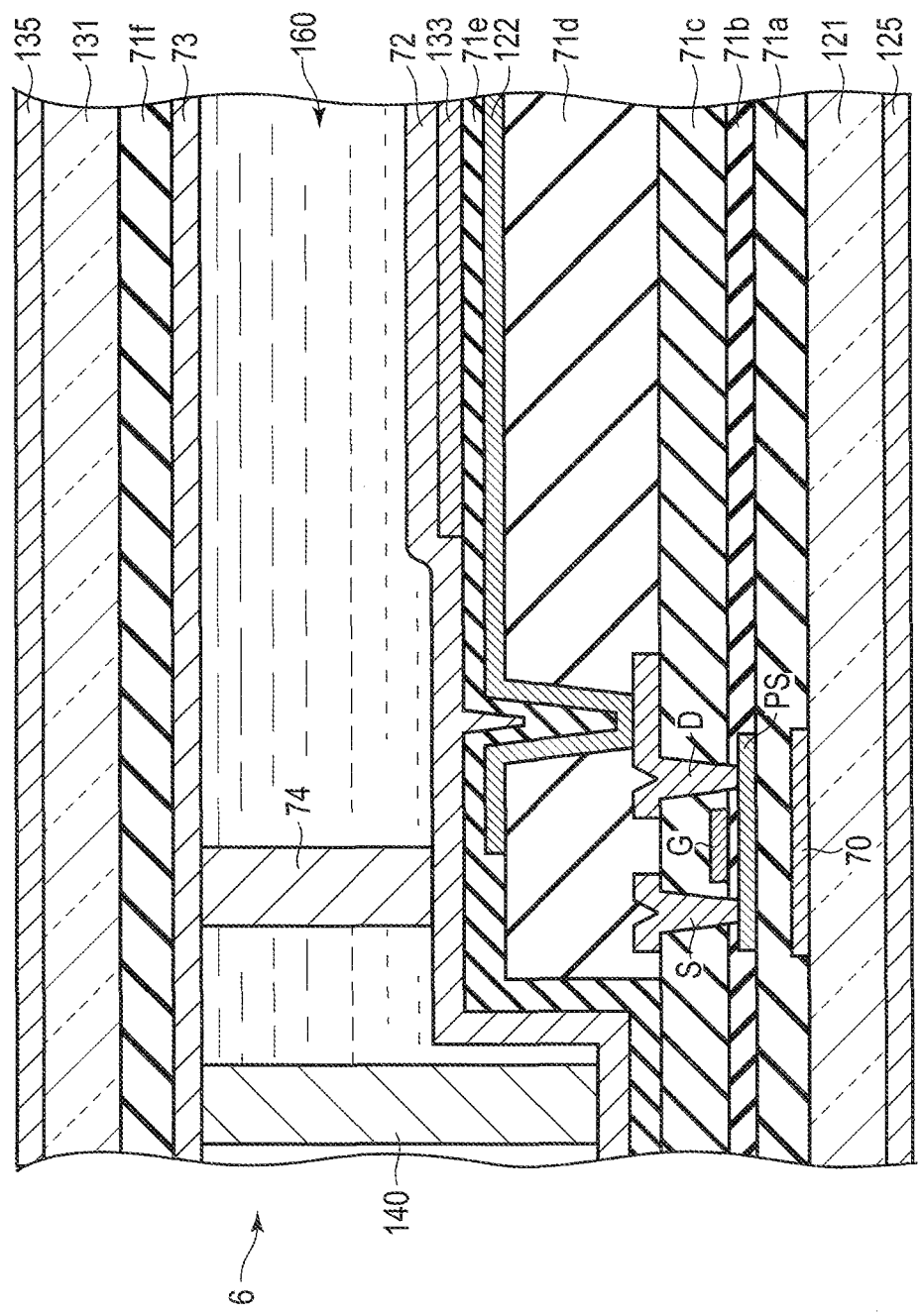
FIG. 19 is an explanatory diagram showing a part of the section of the barrier unit.

FIG. 19 shows a liquid crystal display device of a lateral electric field mode (FFS mode) as a specific example of the barrier unit 6. As shown in FIG. 19, the barrier unit 6 comprises the first substrate 121 and the second substrate 131, the liquid crystal layer 160 is interposed between the first substrate 121 and the second substrate 131, and the first substrate 121 and the second substrate 131 are attached to each other by the sealing member 140. Above the first substrate 121, the plurality of electrodes 122 are elongated in a columnar fashion. The pitch of the first electrodes 122 is set to 10 um. Each of the first electrodes 122 is connected to the second latch/buffer circuit. Further, the second electrode 133 is provided above the first substrate 121 via the insulating layer film 71e. A common potential is supplied to the second electrode 133. The polarizers 125 and 135 are respectively provided on the outer side the first substrate 121 and on the outer side of the second substrate 131. The first electrode 122 and the second electrode 133 are transparent electrodes of ITO or the like.

Further in FIG. 19, 71a-71d denote insulating layers, 72 and 73 denote alignment films. 72f denotes an overcoat layer. PS denotes a semi-conductor layer.

Under the semi-conductor layer PS, light-shielding layer 70 is provided on the first substrate 121. The semi-conductor layer PS, a gate line G, source electrode S and a drain electrode D are comprise a TFT.

FIG. 20 partly shows a relation between the pixel electrodes 122, 122 and the common electrode 133 of the barrier unit. The pixel electrodes 122 and 122 are driven by switches Sw2 and SW2. The common electrode 133 has a plurality of slits 133a to get FFS mode.

As described above, since the display device 1 comprises the barrier unit 6 and the control unit 7 which controls the barrier unit 6, in response to the forward-and-backward movement of the viewing position of the viewer U1 with respect to the display surface 4S of the display device 1, the barrier region having the barrier pitch 65 and the barrier region having the barrier pitch 65a or the barrier pitch 65b are appropriately arranged. In this way, it is possible to prevent a crosstalk and to increase the stereoscopic image viewable distance in the forward-and-backward direction. Further, it is also possible, by appropriately controlling the unit regions 60 of the barrier region having the barrier pitch 65a or the barrier pitch 65b, to prevent streaks or variations in brightness associated with a difference in aperture ratio between the barrier region having the barrier pitch 65 and the barrier region having the barrier pitch 65a or the barrier pitch 65b.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, although the unit region 68b at the boundary between the transmissive region and the nontransmissive region of the barrier region having the barrier pitch 65a or the barrier pitch 65b is alternately displayed in the white display mode and in the black display mode from one frame to another in the embodiment, it is not necessary to switch the white display and the black display on a frame-by-frame, and it is possible to insert the black display every predetermined number of frames such as every two frames or three frames or it is also possible to control the display of the barrier region 68b in various other manners. Still further, it is also possible to prevent the streaks or the variations in the brightness associated with the difference in the aperture ratio between the barrier regions having different barrier pitches by displaying the unit region 68b in halftone instead of alternately displaying the barrier region 68b in the white display mode and in the black display mode.

What is claimed is:

1. A display device comprising:
    a display panel including a display surface which displays an image;
    a barrier panel including a plurality of barrier regions, each of the barrier regions including two nontransmissive regions which block light transmitted from the display unit and one transmissive region which is arranged between the two nontransmissive regions and allows light transmitted from the display panel to pass through; and
    a controller which produces the barrier regions in the barrier panel and controls arrangement of the barrier regions;
    a digital camera which acquires position information of a viewer of the display panel in a perpendicular direction to the display surface, wherein
    the controller controls the barrier region having a first barrier pitch and the barrier region having a second barrier pitch in the barrier panel, the second barrier pitch including the transmissive region having a width which is the same as a width of the transmissive region of the barrier region having the first barrier pitch, and the nontransmissive region having a width which is different from a width of the nontransmissive region of the barrier region having the first barrier pitch,
    the controller controls a boundary region at the boundary between the transmissive region and the nontransmsissive region in the barrier region having the second barrier pitch to be alternately displayed in a transmissive display mode and in a nontransmissive display mode every predetermined number of frames, and the controller adjusts a barrier pitch of the barrier panel based on the position information acquired from the digital camera,
    the controller stores a distance between the viewer and the display surface of the display panel when only the barrier regions having the first barrier pitch are arranged in the barrier panel, as an optimum distance,
    the controller controls, when the viewer moves closer to the display surface from the optimum distance, the barrier region having the first barrier pitch and the barrier region having the second barrier pitch in the barrier panel such that the width of the nontransmissive region of the barrier region having the second barrier pitch is less than the width of the nontransmissive region of the barrier region having the first barrier pitch, and the boundary region at the boundary between the transmissive region and the nontransmissive region in the barrier region having the second barrier pitch such that a part of the transmissive region is alternately displayed in a white display mode and in a black display mode every predetermined number of frames, and the controller controls, when the viewer moves away from the display surface from the optimum distance, the barrier region having the first barrier pitch and the barrier region having the second barrier pitch in the barrier panel such that the width of the nontransmissive region of the barrier region having the second barrier pitch is greater than the width of the nontransmissive region of the barrier region having the first barrier pitch, and the boundary region at the boundary between the transmissive region and the nontransmissive region in the barrier region having the second barrier pitch such that a part of the nontransmissive region is alternately displayed in the white display mode and in the black display mode every predetermined number of frames.

2. The display device of claim 1, wherein the controller symmetrically controls and arranges the barrier regions having the second barrier pitch with respect to the center of the barrier panel.

3. The display device of claim 2, wherein the barrier panel includes a plurality of unit regions, and each of the transmissive region and the nontransmissive region in each of the barrier region having the first barrier pitch and the barrier region having the second barrier pitch is composed of the unit regions, and the controller controls the barrier region having the first barrier pitch and the barrier region having the second barrier pitch based on the position information of the viewer acquired from the digital camera and sets the unit region at the end of the barrier panel as the nontransmissive region according to the number of the barrier regions having the second barrier pitch.

4. A stereoscopic display device comprising:

a display panel including a plurality of pixels arranged in two dimensions; and a barrier panel including a plurality of barrier regions, each of the barrier regions including two nontransmissive regions which block light transmitted from the display panel and one transmissive region which is arranged between the two nontransmissive regions and allows light transmitted from the display panel to pass through;

a controller which produces the barrier regions in the barrier panel and controls arrangement of the barrier regions, wherein the barrier panel comprises a first substrate, a second substrate, a liquid crystal layer which is interposed between the first substrate and the second substrate, a plurality of first electrodes which are provided on the first substrate and are elongated in a columnar fashion, a second electrode which is provided on either one of the first substrate and the second substrate, and a driver which is formed on the first substrate and drives the first electrodes, a pitch of the first electrodes is less than a pitch of the pixels of the display panel, the second electrode of the barrier panel is arranged on the first electrodes via an insulating film, and is supplied a common voltage, the driver comprises a shift register circuit which receives a drive signal from the controller, a latch circuit which sequentially stores a signal from the shift register circuit, and a buffer circuit which temporarily stores the drive signal for the barrier panel and outputs the signal to the barrier panel, the buffer circuit is connected to the first electrodes, and the driver is polysilicon.

5. A display device comprising:

a display panel including a display surface which displays an image;

a digital camera which acquires position information of a viewer of the display device in a perpendicular direction to the display surface;

a barrier panel including a plurality of barrier regions, each of the barrier regions including two nontransmissive regions which block light transmitted from the display panel and one transmissive region which is arranged between the two nontransmissive regions and allows light transmitted from the display panel to pass through;

a controller which produces the barrier regions in the barrier panel and controls arrangement of the barrier regions in the barrier panel based on the position information acquired from the digital camera, wherein the controller controls the barrier region having a first barrier pitch and the barrier region having a second barrier pitch in the barrier panel, the second barrier pitch including the transmissive region having a width which is the same as a width of the transmissive region of the barrier region having the first barrier pitch, and the nontransmissive region having a width which is different from a width of the nontransmissive region of the barrier region having the first barrier pitch, the barrier panel comprises a first substrate, a second substrate, a liquid crystal layer which is interposed between the first substrate and the second substrate, a plurality of first electrodes which are provided on the first substrate and are elongated in a columnar fashion, a second electrode which is provided on either one of the first substrate and the second substrate, and a driver which is formed on the first substrate and drives the first electrodes, a pitch of the first electrodes is less than a pitch of the pixels of the display panel, the first electrodes produce the first barrier pitch and the second barrier pitch, the driver comprises a shift register circuit which receives a drive signal from the controller, a latch circuit which sequentially stores a signal from the shift register circuit, and a buffer circuit which temporarily stores the drive signal for the barrier panel and outputs the signal to the barrier panel, the controller controls the barrier region having the first barrier pitch and the barrier region having the second barrier pitch in the barrier panel, the second barrier pitch includes the transmissive region having a width which is the same as a width of the transmissive region of the barrier region having the first barrier pitch, and the nontransmissive region having a width which is different from a width of the nontransmissive region of the barrier region having the first barrier pitch, and the controller controls a boundary region at the boundary between the transmissive region and the nontransmsissive region in the barrier region having the second barrier pitch to be alternately displayed in a transmissive display mode and in a black display mode every predetermined number of frames.

6. The display device of claim 5, wherein the controller controls a boundary region at the boundary between the transmissive region and the nontransmissive region in the barrier region having the second barrier pitch to be displayed in a halftone display mode.

* * * * *